(12) United States Patent
Kuroshima

(10) Patent No.: US 8,068,238 B2
(45) Date of Patent: Nov. 29, 2011

(54) IMAGE PROCESSING APPARATUS, IMAGE PROCESSING METHOD, AND IMAGE PROCESSING PROGRAM SUPPORTING EMBEDDED FINISHING MANAGER

(75) Inventor: Masashi Kuroshima, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 999 days.

(21) Appl. No.: 11/408,512

(22) Filed: Apr. 21, 2006

(65) Prior Publication Data

US 2006/0238803 A1 Oct. 26, 2006

(30) Foreign Application Priority Data

Apr. 26, 2005 (JP) ................. 2005-127899

(51) Int. Cl.
*G06F 3/12* (2006.01)
*G03B 27/32* (2006.01)
*G03B 27/04* (2006.01)

(52) U.S. Cl. ............. 358/1.1; 358/1.15; 355/77; 355/88

(58) Field of Classification Search ............... 358/1.15, 358/1.13, 1.1, 1.12, 2.1, 448, 426.04, 401, 358/539, 501; 709/201, 203, 217, 223, 225, 709/226, 220, 249; 705/2, 3, 7, 14.26, 80; D18/40, 34.1; 355/77, 88

See application file for complete search history.

(56) References Cited

U.S. PATENT DOCUMENTS

| | | | |
|---|---|---|---|
| 6,175,426 B1 | 1/2001 | Hirooka | |
| 7,567,360 B2 * | 7/2009 | Takahashi et al. | 358/1.15 |
| 2002/0194245 A1 * | 12/2002 | Simpson et al. | 709/101 |
| 2004/0190057 A1 | 9/2004 | Takahashi et al. | |

FOREIGN PATENT DOCUMENTS

| | | |
|---|---|---|
| CN | 1195804 | 1/2001 |
| EP | 1136283 A2 | 9/2001 |
| JP | 08-248841 | 9/1996 |
| JP | 2000-001008 | 1/2000 |
| JP | 2003-029482 A | 1/2003 |
| JP | 2003-288200 | 10/2003 |

* cited by examiner

*Primary Examiner* — Beeny Tieu
*Assistant Examiner* — Ngon Nguyen

(57) ABSTRACT

A method for printing drawing data on the basis of work process steps described in a job ticket, includes: receiving a job ticket and drawing data; judging whether work process steps should be changed on the basis of a process status in the image processing apparatus; a second judgment step of judging whether there is an external device different from the image processing apparatus and capable of executing at least one of the work process steps; and creating a job ticket for causing the external device to execute the work process steps if determined to exist. The method solves the problem that an image processing apparatus cannot change work process steps during the print job process, and a significant delay may occur in a process schedule. Work process steps that should be processed by the image processing apparatus are changed according to a process status in the image processing apparatus.

4 Claims, 31 Drawing Sheets

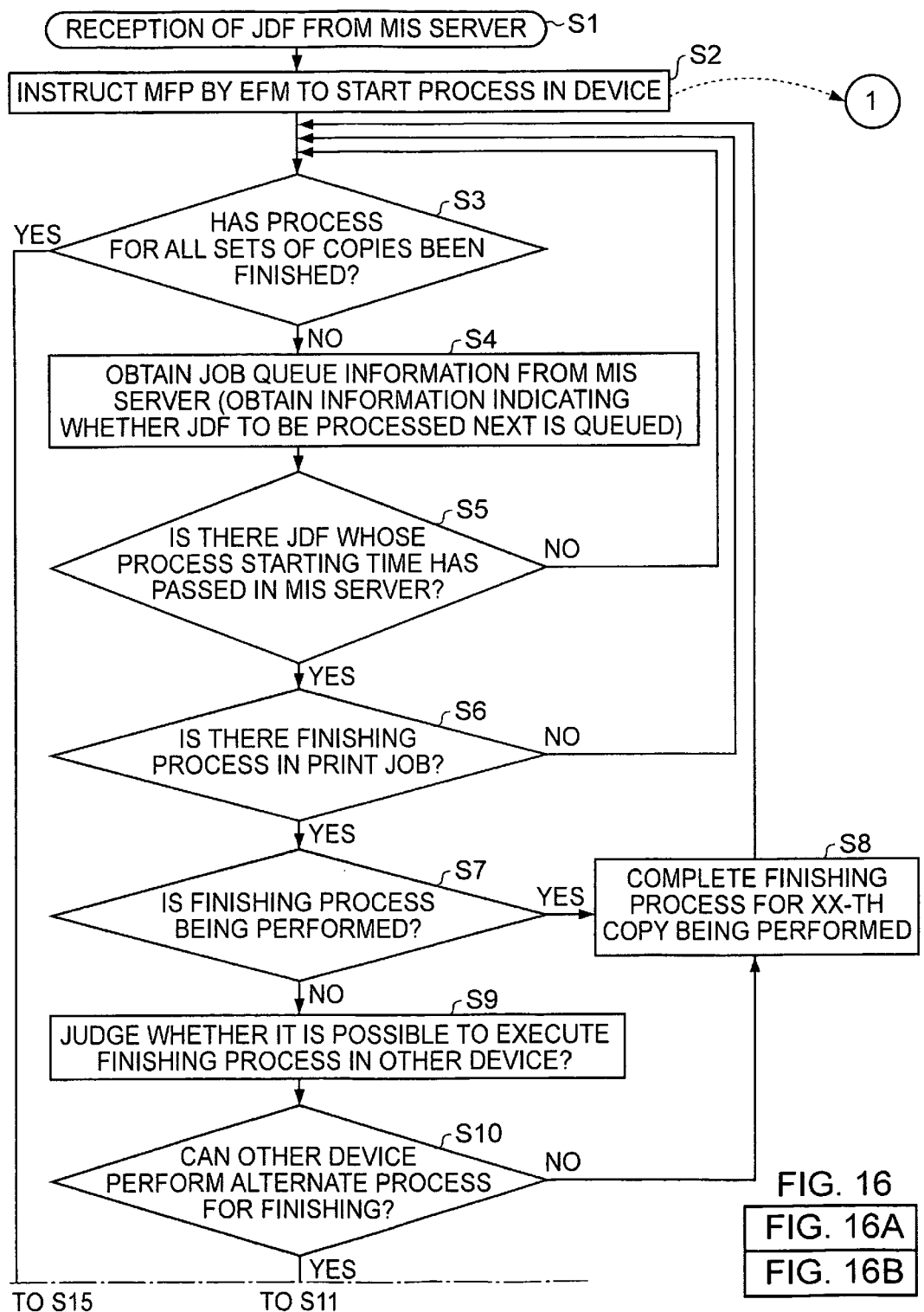

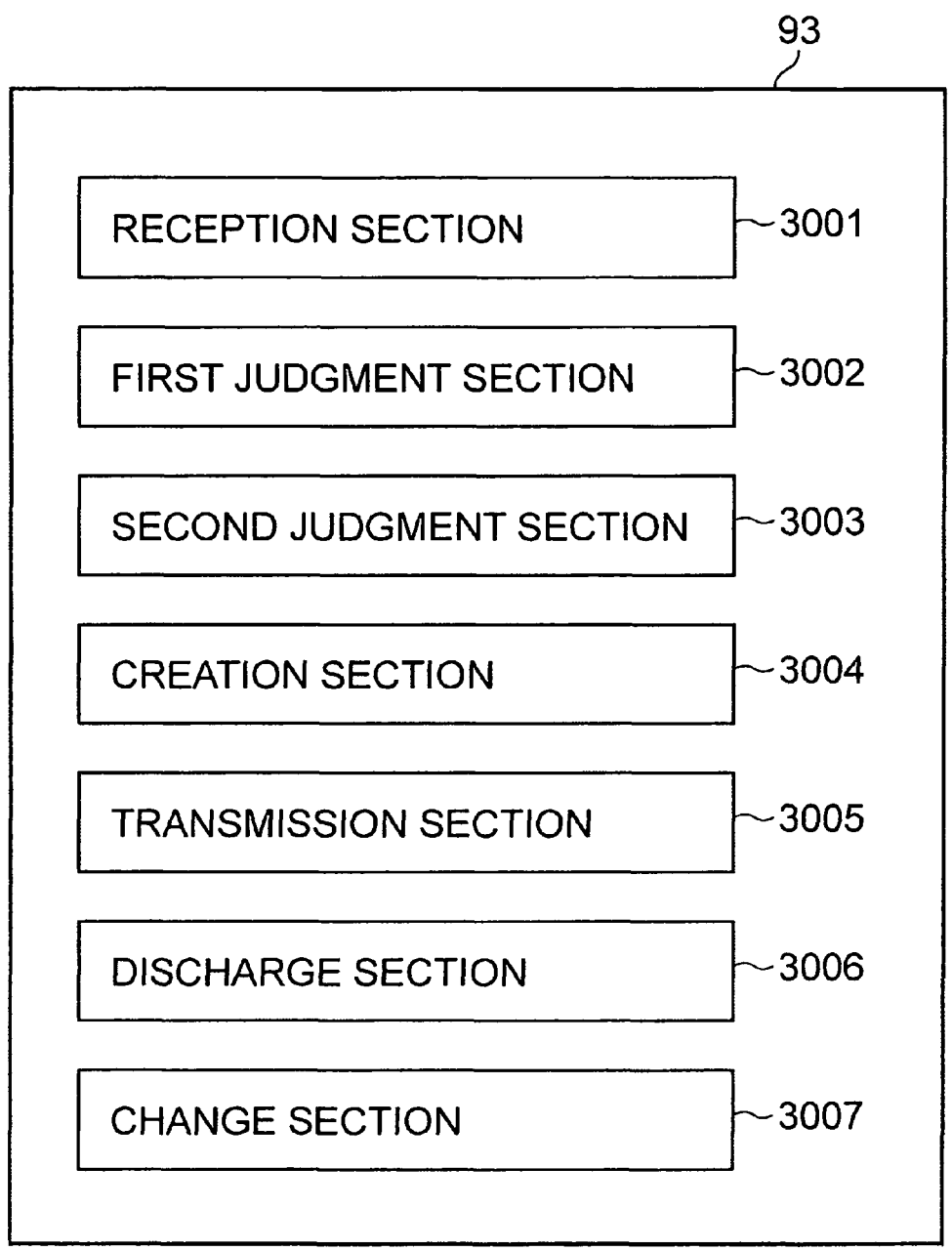

IMAGE PROCESSING APPARATUS, IMAGE PROCESSING METHOD, AND IMAGE PROCESSING PROGRAM SUPPORTING EMBEDDED FINISHING MANAGER

BACKGROUND OF THE INVENTION

1. Field of the Invention

The present invention relates, for example, to a finisher device for performing a book binding process such as wrapping binding processes, an image processing apparatus capable of executing image processing configured by a plurality of process steps, and an image processing method.

2. Description of the Related Art

Up to now, in a commercialized printing industry, order entries for creating print products (such as magazines, newspapers, catalogues, advertisements, and gravures) from a third party (a customer, or a client) are received in order to create the printed products desired by the client, and the printed products are delivered to the client with a fee received from the client in return. Currently, the commercialized printing industry still uses large-scale printing apparatus such as offset reproduction print machines as the primary reproduction method. In the printing industry, this operation has been carried out by various process steps including original reception, design and layout, comprehensive layout (presentation made by printer outputs), revision (layout correction and color correction), proof print, layout paper creation, printing, post-treatment process, and delivery.

Meanwhile, in recent years, along with the achievement of a high speed and a high image quality of an electrophotographic printing apparatus or an inkjet printing apparatus, a market has developed which is called "print on demand" (hereinafter, expressed as POD) for providing quick delivery of printed products. The POD does not use any large-scale apparatus or system. The POD is designed for a job with a relatively small number of lots as compared with a job processed by a printing apparatus.

In the POD market, instead of using the above-mentioned large-scale printing machine or system, for example, a digital image process device such as a digital copying machine or a digital multifunction machine is utilized to a maximum extent in order to realize digital print with use of electronic data to produce the merchandise. In such a POD market, as compared to the past printing industry, digitalization is advanced and computerized management and control prevail.

A known technology of using a finisher device connected to other image processing apparatus generally refers to a dispersed paper-discharging process technology using a plurality of finisher devices. The dispersed paper-discharging process technology is disclosed in Japanese Patent Laid-Open No. 2003-29482, titled "Image output management apparatus, image forming apparatus, paper discharging process apparatus, image processing system, image processing method, recording medium, and program". With this technology, a user selects a device for performing the dispersed paper-discharging process among finisher devices connected to each other on a network and the print job is then executed.

However, according to the above-described related-art technology, the finisher device is selected as a dispersion target by the user in advance and the execution of the dispersed paper-discharging process needs to be instructed. So any change cannot be made after the print job process has started. For this reason, once the print job is started, the time consumed for the job process is longer than expected. Even when the print operation is behind schedule, unless the job execution itself is terminated, the change in job operational instructions cannot be made to increase the operational process speed through job dispersion and job alternation of the finishing process or the like, which leads to a problem. In addition, another problem occurs in the following situation. The image processing apparatus in use is scheduled to perform the next print job, but even when the time at which the next print job is performed passes, no measures can be adopted until the print job currently being processed is finished.

Furthermore, when an error occurs such as shortage of staples of a stapler and the process stops, there is also a problem in that the process is suspended until the error is eliminated.

The present invention has been made in view of the above-mentioned problems, and the invention provides a method of causing one or plural external devices connected to a network to accept job dispersion or job alternation of the operational burden even when the process is being performed, to improve the work efficiency of the entire system and also causing the external device having accepted the job dispersion or job alternation to execute the process based on the content of the original setting.

Also, the present invention can provide a construction to obtain a performance, a use condition, and a work schedule of the external device connected via the network to the image processing apparatus. With this construction, even after the print process is started, it is possible to automatically judge whether or not the work efficiency should be improved by way of the job alternation to cause other device to execute the process on the basis of the above-mentioned information and whether or not the improvement of the work efficiency can be actually achieved. The present invention can further improve the work efficiency by causing the external device connected to the network to perform the process allocated through the job dispersion or job alternation on the basis of the judgment of the image processing apparatus.

In addition, the present invention provides a construction where an output destination of the print job is changed to another paper discharge section from a predetermined paper discharge section (for example, a paper discharge section for the book binding process) depending on the process condition while the image processing apparatus is executing the print job in which the book binding print process is specified. With this configuration, after the print job being processed is printed out, a postprint process can be started by using a postprint process device different from the image processing apparatus, thereby further improving the work efficiency.

Furthermore, the present invention provides a construction where even after the job dispersion or job alternation process is started from the image processing apparatus to an arbitrary external device connected to the network at an arbitrary time, the system shows a user a message that the job alternation or dispersion process is performed, a name of the external device for performing the job alternation or dispersion process or a flow to the process allocated through the job dispersion or job alternation, or a flow to perform the job alternation or dispersion process. With this construction, the user is less likely to make an operational error during the work.

Moreover, the present invention provides a construction where even when the finisher device installed in the image processing apparatus has any error or failure, the work efficiency of the entire system can be improved without stopping the print job as an error by causing one or plural nearline finisher devices connected to the network to alternately perform the work.

SUMMARY OF THE INVENTION

According to an aspect of the present invention, the invention provides an image processing apparatus for printing drawing data on the basis of work process steps described in a job ticket, including: reception means for receiving a job ticket and drawing data; first judgment means for judging whether or not work process steps that should be processed in the image processing apparatus are changed on the basis of a process status in the image processing apparatus; second judgment means for judging whether or not there is an external device different from the image processing apparatus and capable of executing at least one of the work process steps that should be processed in the image processing apparatus when the first judgment means judges that the work process steps in the image processing apparatus are changed; and creation means for creating a job ticket for causing the external device to execute the work process steps when the second judgment means judges that the external device capable of executing at least one of the work process steps that should be processed in the image processing apparatus exists.

Other features and advantages of the present invention will be apparent from the following description taken in conjunction with the accompanying drawings, in which like reference characters designate the same or similar parts throughout.

BRIEF DESCRIPTION OF THE DRAWINGS

The accompanying drawings, which are incorporated in and constitute a part of the specification, illustrate embodiments of the invention and, together with the description, serve to explain the principles of the invention:

FIGS. 16A and 16B are first flowcharts for describing a process of the first embodiment;

FIG. 30 is a diagram for describing a process section of the present invention.

DESCRIPTION OF THE EMBODIMENTS

Preferred embodiments of the present invention will now be described in detail in accordance with the accompanying drawings.

Hereinafter, with reference to FIGS. 1 to 4, a construction example of a related-art POD system will be described.

Figure 1:
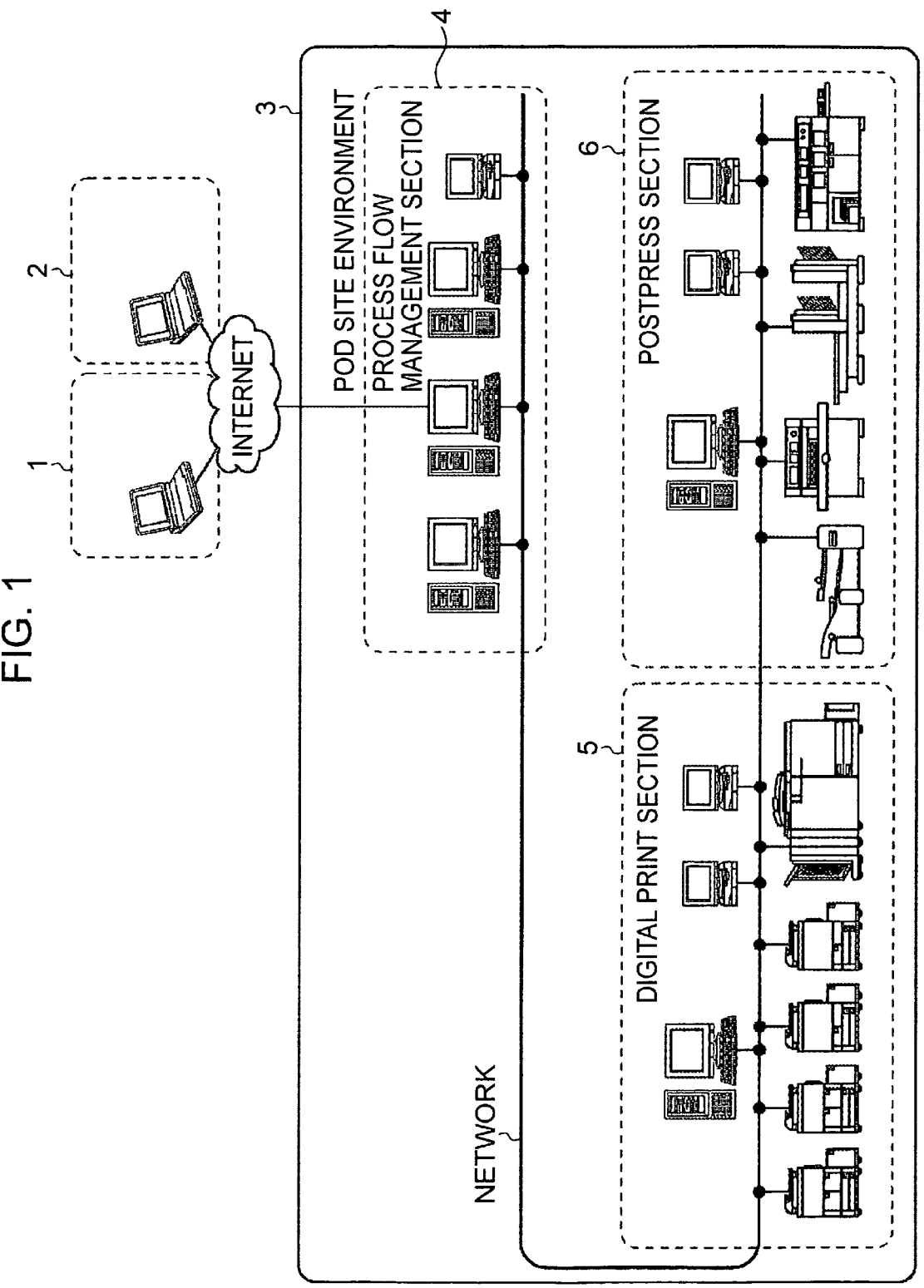
FIG. 1 is a construction diagram of a related-art printing system.

FIG. 1 shows an example of the POD system, and is a block diagram of an example of a basic construction of the whole printing system according to the present invention.

This block diagram is structured by one or a plurality of end user environments 1 and 2, and a print on demand (POD) site environment 3 connected to the end user environments via the Internet.

The end user environments 1 and 2 involve ordering persons who issue order requests for printing. From the respective end user environments (in this case, an end user environment A and an end user environment B), it is possible to check a request for the print job and a status of the job by using client PCs, for example.

On the other hand, the POD site environment 3 is generally constructed by a process flow management section 4 and a digital print section 5. Also, when the function and capacity of a finishing device connected to a digital image process device such as a digital copying machine or a digital multifunction machine are not satisfactory, the POD site environment 3 may be constructed with three components, that is, a PostPress section 6 in addition to the process flow management section 4 and the digital print section 5.

The process flow management section 4 instructs operation of the respective process steps of the process flow management section 4, the digital print section 5, and the PostPress section 6 in a POD site environment, thereby managing the work flow of the system composed of a computer and various devices. Furthermore, the process flow management section 4 is adapted to receive the job from the above-mentioned end user, store the job from the end user, assemble the operations in the respective process steps as a work flow in accordance with the job specification from the end user, and set the operations in the respective devices and operators in an efficient schedule.

The digital print section 5 produces a copy of a paper original received from the end user by a monochrome MFP, a color MFP, or the like in accordance with the operational instructions of the job received from the process flow management section 4. Also, from the client PC via a print driver or a hot holder, the digital print section 5 outputs a printout of a text/image file received from the end user, an image file created through scanning by a scan device, or a text/image file created by editing those files to the print device such as the monochrome MFP or the color MFP. It should be noted that the MFP stands for multi function peripherals, which will be expressed as MFP hereinafter in this specification.

The PostPress section 6 controls post-treatment devices such as a paper folding machine, a saddle stitching binding machine, a wrapping binding machine, a trimming machine, an inserting machine, a collating machine, and the like in accordance with the operational instructions of the postpress job received by the process flow management section 4 or the digital print section 5. Furthermore, the PostPress section 6 is adapted to execute finishing processes of paper folding, saddle stitching binding, wrapping binding, trimming, inserting, collating, and the like on the print original output from the digital print section 5.

Figure 2:
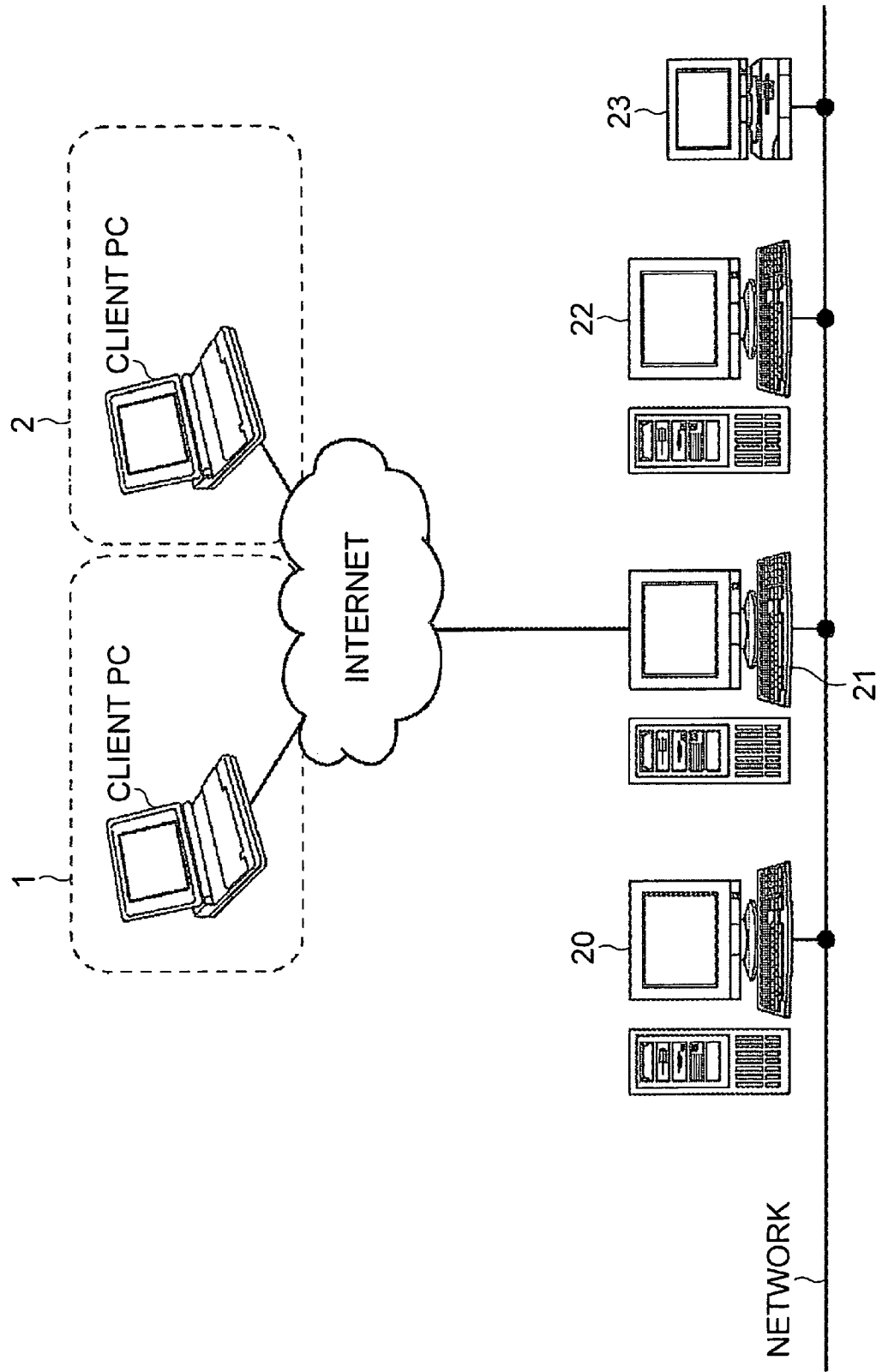
FIG. 2 is a construction diagram of a related-art process flow management section.

FIG. 2 is a block diagram showing an example of the construction of the process flow management section 4 in the printing system.

The process flow management section 4 is composed of a management information system (MIS) server 20, an order entry server 21, a file server 22, a client PC 23, and the like, which are connected to the network.

Herein, the MIS server 20 is a server for managing the work flow of the entire system from the order entry to the delivery and also a server in a system for performing overall management of various business information and sales information.

The order entry server 21 is a server for receiving the job from the end user environment via the Internet. The received job is managed on the basis of a job ID number. The ID number and information necessary for the management are transmitted to the MIS server 20. The order entry server 21 is adapted to transmit other information such as drawing data along with the necessary information to the downstream process steps in accordance with the instruction of the MIS server 20.

The file server 22 is a text management server for holding the job received from the end user for the case of the reorder entry for the same original from the end user. In general, the image data and the setting information of the job (job ticket) output previously are stored together.

Information is exchanged among the MIS server 20, the order entry server 21, the file server 22, the client PC 23 in the process flow management section 4 by using the job ticket that is so called job definition format (JDF), in which the operational instructions of the job are described, and the like. The process flow management section 4 transfers the job and issues a control command, thereby providing total automation of the work flow by mainly using the process flow management section 4 in association with the digital print section 5, the PostPress section 6, and the like.

Figure 3:
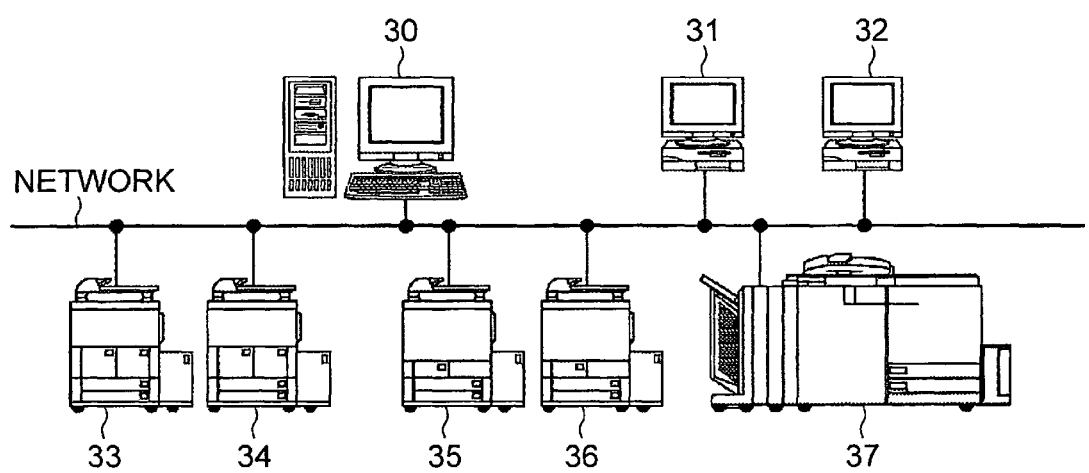
FIG. 3 is a construction diagram of a related-art digital print section.

FIG. 3 is a block diagram showing an example of the construction of the digital print section 5 in the printing system. Herein, at least each one of a print server 30, client PCs 31 and 32, color MFPs 35, 36, and 37, and monochrome MFPs 33 and 34 is present while being connected to the network.

The print server 30 has two roles. The first role is to exchange information with the external side of the digital print section 5. The input job image information, the setting information, and the like are first input to the print server. The print server 30 is adapted to notify the outside of information about the status, etc. when the job is finished. The second role is to manage and control the inside of the digital print section 5. The job input from the outside and the job created in the digital print section 5 are managed by the print server 30, so it is possible to monitor the status of all the devices in the digital print section 5 and all the jobs. Furthermore, the print server 30 is configured to temporarily stop the job, change the setting, or resume the print process, or perform controls including duplication, transfer, or deletion of the job.

The client PCs 31 and 32 plays a role to edit the input application file, instruct the print, or introduce a print ready file, and plays another role to support monitoring and control of the devices and the jobs managed in the print server 30.

Each of the color MFPs 35, 36, and 37 and the monochrome MFPs 33 and 34 is an image processing apparatus having various functions such as scan, print, and copy. The color MFP and the monochrome MFP are different in speed and cost, so the color MFP and the monochrome MFP are accordingly used on the basis of the respective purposes. A finisher device is connected to the color MFP 37.

Figure 4:
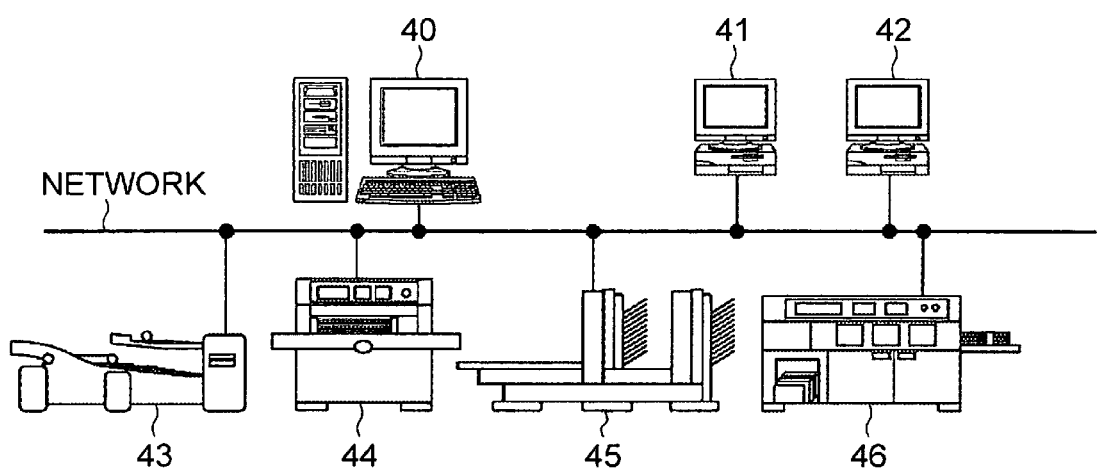
FIG. 4 is a construction diagram of a related-art PostPress section.

FIG. 4 is a block diagram showing an example of the construction of the PostPress section 6 in the printing system.

The PostPress section 6 is constructed by a PostPress server 40, client PCs 41 and 42, and post-treatment process machines represented by a paper folding machine 43, a trimming machine 44, a saddle stitching machine 45, and a wrapping binding machine 46.

First of all, the PostPress server 40 is a computer for performing overall management on the post-treatment steps. The PostPress server 40 creates a post-treatment condition with which the PostPress section 6 can finish the print process afterwards in accordance with the instructions of the job received by the order entry server or the instructions of the job output from the MIS server 20, and gives instructions for the post-treatment (finishing process) steps as desired by the end user. In general, the PostPress server 40 exchanges information with the outside of the PostPress section 6. The internal command and status in the PostPress section 6 are used for information exchange with the respective post-treatment process machines.

The post-treatment process machines can be mainly sorted out into three types, and the definition is given as follows.

Inline finisher: a post-treatment device in which a paper path is physically connected to the MFP, and the operational instructions and the condition check are also electrically connected to the MFP. Hereinafter, the finisher device mentioned alone refers to an inline finisher device.

Nearline finisher: a post-treatment device in which a paper path is not physically connected to the MFP, and an operating person (operator) carries the output products, but information regarding the operational instruction and the condition check can be transmitted and received via communication means such as the network.

Offline finisher: a post-treatment device in which the paper path and the communication means such as the operational instructions and the condition check are not connected to the MFP at all, and the operating person checks with eyes the carrying out the print outputs, the setting of the print outputs, the operational input by manual procedures, and the condition report from the device itself.

Moreover, the post-treatment process machine executes post-treatment steps such as sheet processing treatment on the output original paper printed with the image processing apparatus such as the MFP, including the trimming process step, the saddle stitching book binding process step, the wrapping binding process step, the paper folding process step, the punching process step, the inserting process step, the collating process step, and controls the treatment for the book binding format provided to the end user.

The nearline finisher managed by the PostPress server 40 (in some cases, also including the offline finisher) includes various components including a stapler, a punching machine, an inserting machine, and a collating machine (collator) in addition to the paper folding machine 43, the trimming machine 44, the saddle stitching machine 45, the wrapping binding machine 46 shown in FIG. 4. The PostPress server 40 grasps the device condition and the job condition through polling based on a predetermined protocol with these nearline finishers to manage the execution condition of the job. It should be noted that according to this embodiment, the above-mentioned plural print post-treatments (the finishing processes) can be executed by individual print post-treatment devices (the finisher devices), respectively, or the plural types of the finishing process can be executed by a single finishing process device. Alternatively, among the plural finishing process devices, any of the finishing process devices can be applied to the present system. It should be noted that in this specification, the print post-treatment, the PostPress process, and the finishing process refer to the same process.

Then, in the POD system, the print post-treatment steps of all print jobs are not necessarily performed by the PostPress section 6. The image processing apparatus (for example, the color MFP 37, or the like) having the finisher device may also execute a post-treatment step as well. It should be noted that the finisher device is equivalent to the above-mentioned inline finisher of the image processing apparatus.

The process flow management section 4 of FIG. 2 and the PostPress section 6 of FIG. 4 may represent an example of this embodiment but in this embodiment, the construction shown in FIG. 9 described below will be employed. In addition, regarding a digital print section 5 of FIG. 3, the print server 30 is not necessary, and the MFP itself possesses the function of information transmission and reception with the outside of the digital print section 5 provided to the print server 30 and the management and control function of the print job. To be specific, an embedded finishing manager (EFM) section possesses the above function, and the details will be described later. It should be noted that the job ticket herein is an operational instruction in which the content of the operational instructions is described.

Furthermore, in the past commercialized printing industry, commercialized print work flow using a job ticket is proposed. Hereinafter, with reference to FIGS. 5 to 7, "the work flow based on the job ticket" and the job ticket according to the POD system in the past commercialized printing industry will be described by way of an example.

Figure 5:
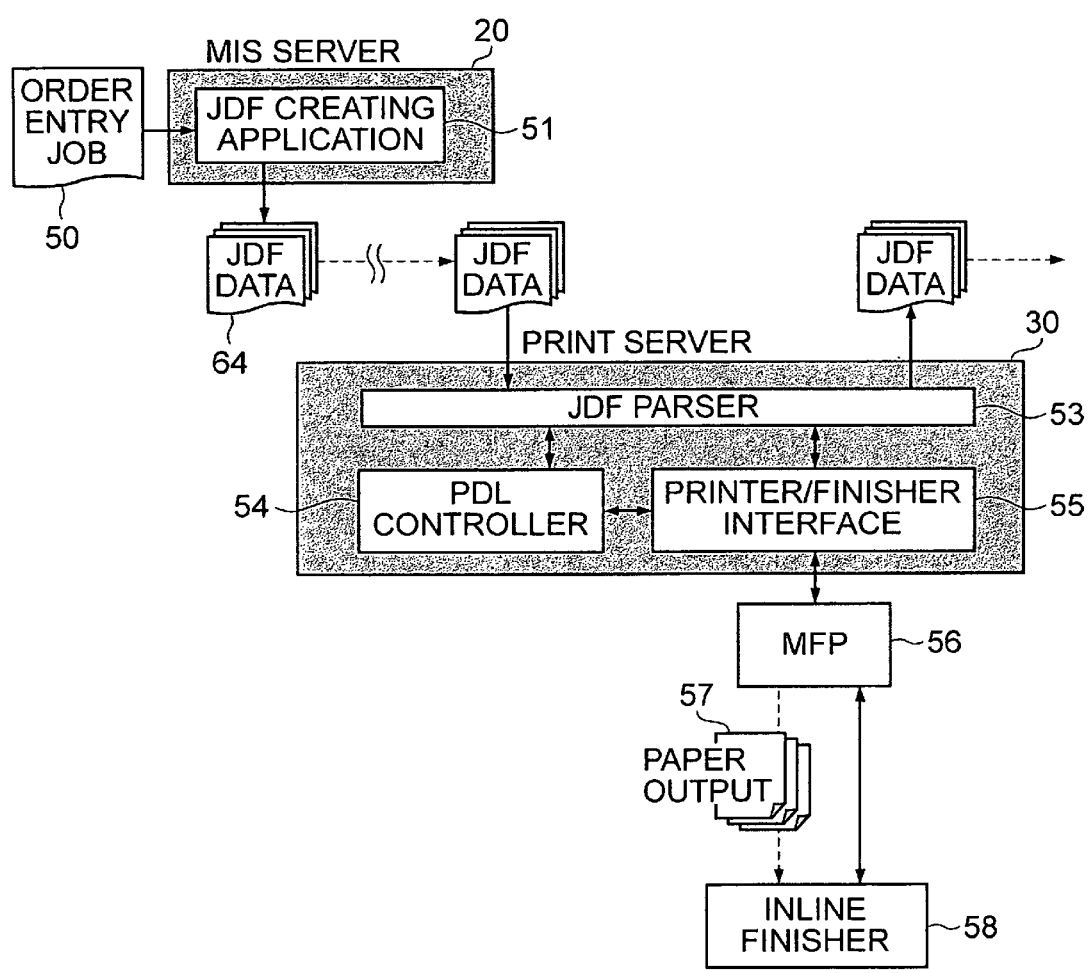
FIG. 5 is a diagram for describing a work flow based on a related-art job ticked.

FIG. 5 is a diagram showing an example of a work flow structure realized on the basis of a job ticket. The MIS server 20 manages the work flow of the entire system from the order entry to the delivery, and also is a system for performing overall management on various business information and sales information. The MIS server 20 is composed of a creating application 51 for creating JDF (job definition format) data 64 equivalent of the job ticket in which the operational instructions in the work flow are described. It should be noted that in this specification, when it is judged that the job dispersion or the job alternation needs to be performed as described below, it is assumed that an EFM 92 described later creates the JDF for the job dispersion or the JDF for the job alternation. However, when the request from the EFM 92 is received, it is also conceivable that the MIS server 20 creates the DF for the job dispersion or the JDF for the job alternation.

The print server 30 is a server for receiving the job input to the digital print section 5 and for managing and controlling the entirety of the digital print section 5. The print server 30 is composed of a JDF parser 53 for analyzing the JDF data 64, a PDL controller 54 for processing various printer description language (PDL) data such as PDF/PS, and a printer/finisher interface 55 for connecting a finisher device (for example, an inline finisher 58) to a printer engine such as an MFP 56.

The work flow based on the job ticket is realized as in the following manner. When the MIS server 20 receives an order entry job 50 (also referred to as order), a job definition format (JDF) creating application 51 installed in the MIS server 20 creates the JDF data 64 equivalent to the job ticket in which the operational instructions in the work flow are described.

When the created JDF data 64 is conveyed to the print server 30, the JDF parser 53 in the print server 30 analyzes the JDF data 64 to execute the job with respect to the digital print section. For example, attributes such the output paper size, double-sided or single-sided print, and N-up are specified in the JDF data. On the basis of content of the JDF data, the PDL controller 54 processes the PDL data such as PDF/PS that is referred to by the JDF data 64, and executes the print with respect to the MFP 56 via the printer/finisher interface 55.

An output original 57 output through the print execution is conveyed to the inline finisher 58. If the print post-treatment such as the wrapping binding, the saddle stitching binding, or trimming is specified to the JDF data 64, on the basis of the content of the JDF data, the printer/finisher interface 55 instructs a finisher-A (for example, the inline finisher 58) to execute the post-treatment.

Figure 6:
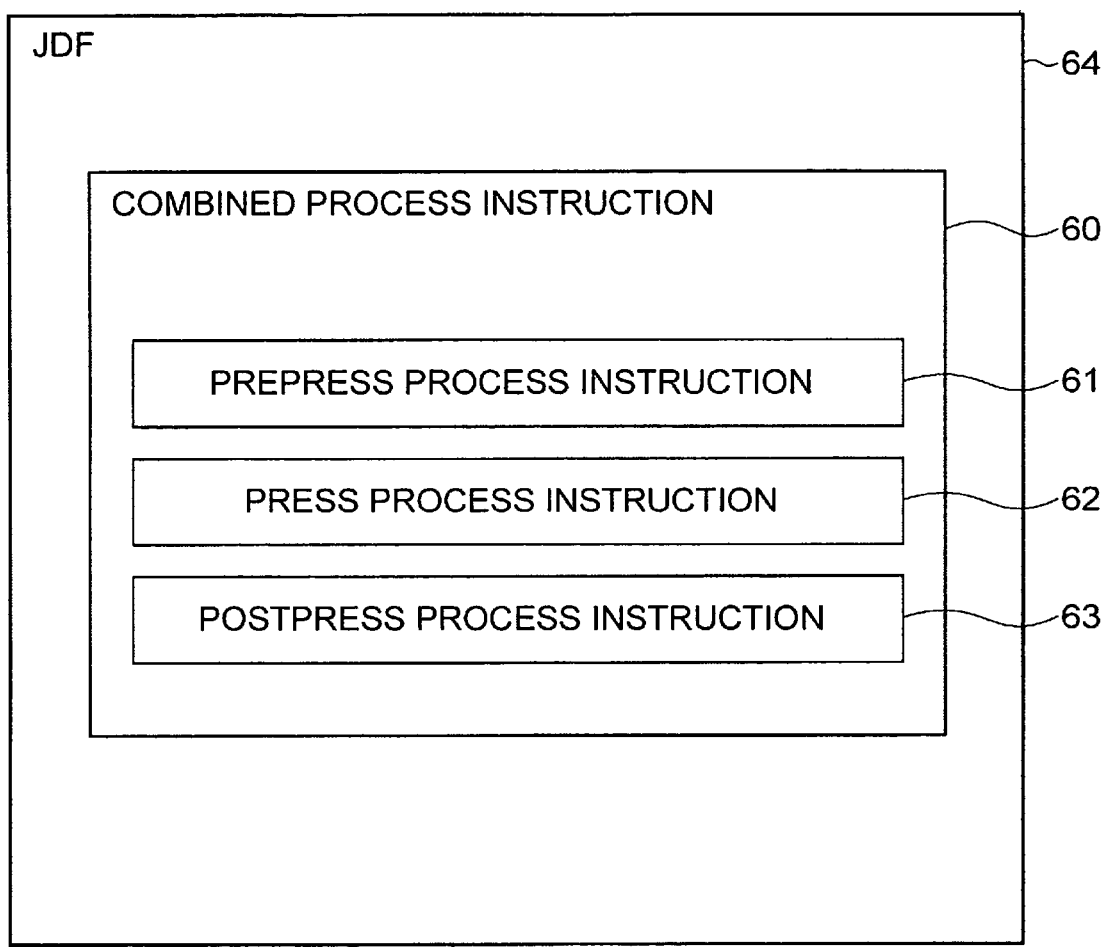
FIG. 6 is a first diagram for describing a construction of a related-art JDF (job definition format)

FIG. 6 shows an example of the structure of the job ticket in the POD system.

A job definition format (JDF) 64 shows the entirety of the JDF data. A PrePress process instruction 61 describes plural PrePress process instruction groups including how the print content data (drawing data) such as the PDF is subjected to image processing and how the instructions are arranged. A Press process instruction 62 describes plural Press process instruction groups including how the image data created by the PrePress process 61 is output as the print original. A PostPress process instruction 63 describes plural PostPress process instruction groups including how the print original output in accordance with the instruction of the Press process 62 is subjected to the post-treatment such as wrapping binding. A combined process 60 indicates a combined process in which the PrePress process 61, the Press process 62, and the PostPress process 63 are put together.

In usual cases, the image processing apparatus for controlling digital print (in this specification, the color MFP 37 and the like) outputs a result obtained after the execution of the process from the PrePress process to the PostPress process in response to one print job input. When such an instruction is issued that the PrePress process, the Press process, and the PostPress process are executed and the output result is output in response to one data input, the combined process is used. The combined process is used when the image processing apparatus such as the MFP capable of executing at least two of the PrePress process, the Press process, and the PostPress process is instructed.

It should be noted that the PrePress process refers to a preprint process, the Press process refers to a print process the print process, and the PostPress process refers to a print post-treatment and a finishing process.

Figure 7:
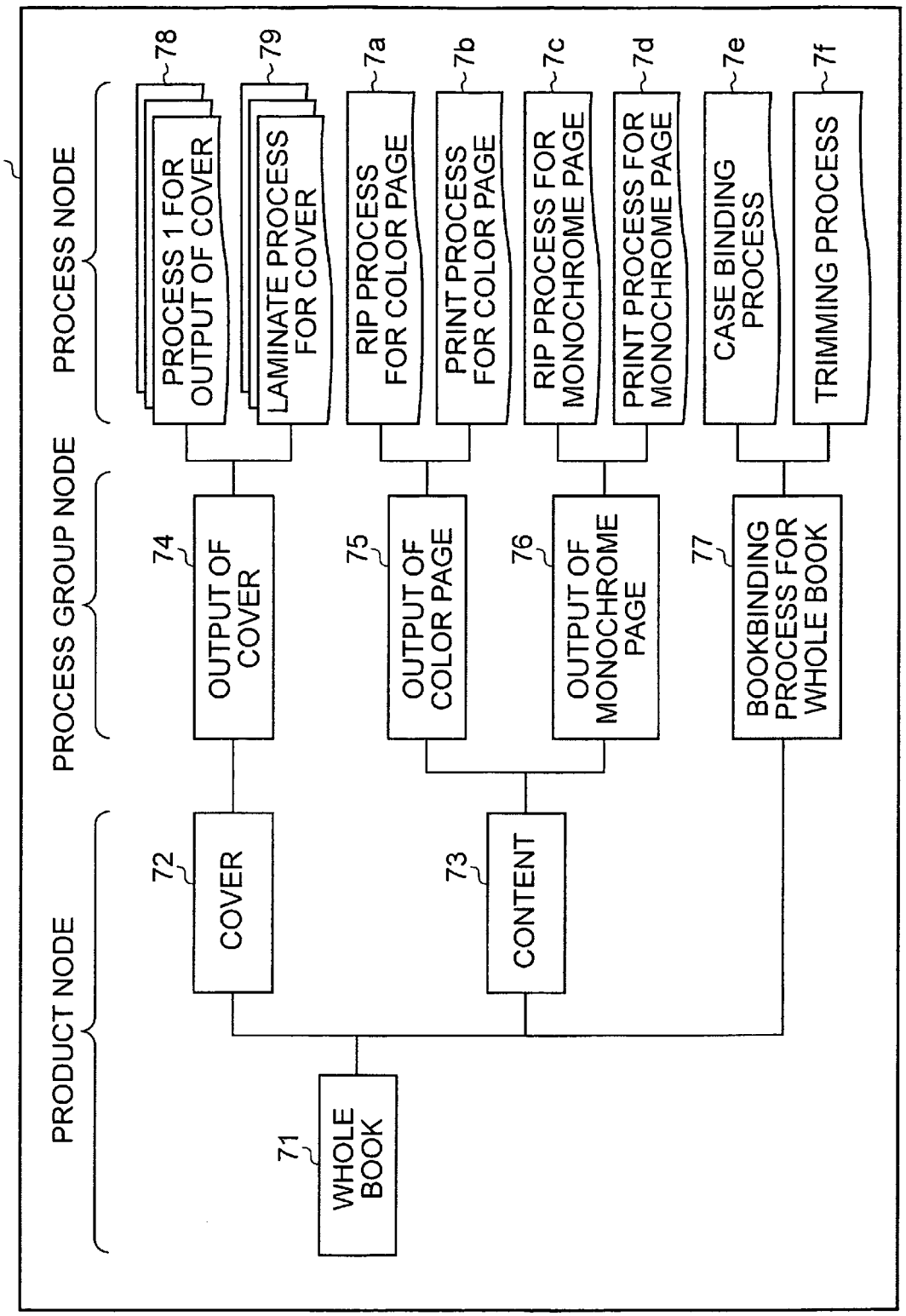
FIG. 7 is a second diagram for describing the related-art JDF.

FIG. 7 shows another example of structure of the job ticket in the POD system. In FIG. 7, a job definition format (JDF) for representing the job ticket is described in the XML format, and expressed in the form of node hierarchy. FIG. 7 is a hierarchy diagram showing an example of the JDF to execute the book binding process. Meanwhile in FIG. 6, the JDF structure is indicated with a type of the execution process.

In order to create a "book" 71, such various steps are required that a cover 72 is made, a content 73 is made, and the cover and the content are bound before the created "book" 71 is delivered to the end user.

In the JDF, when constructing an output product, such a distinction is made that a step for creating a physical output product is referred to as a product node, a processing step for creating the product node is refereed to as a process node, and several process node sets that are intermediate steps for creating the product node are referred to as a process group node.

The PrePress process 61 in FIG. 6 corresponds to an RIP process 7a for color pages and an RIP process 7c for monochrome pages. The Press process 62 corresponds to a cover output process-1 denoted by reference numeral 78, a laminate process 79 for the cover, a print process 7b for a color page print process, and a print process 7d for a monochrome page print process. The PostPress process corresponds to a book binding process 7e for wrapping binding and a trimming process 7f.

Figure 8:
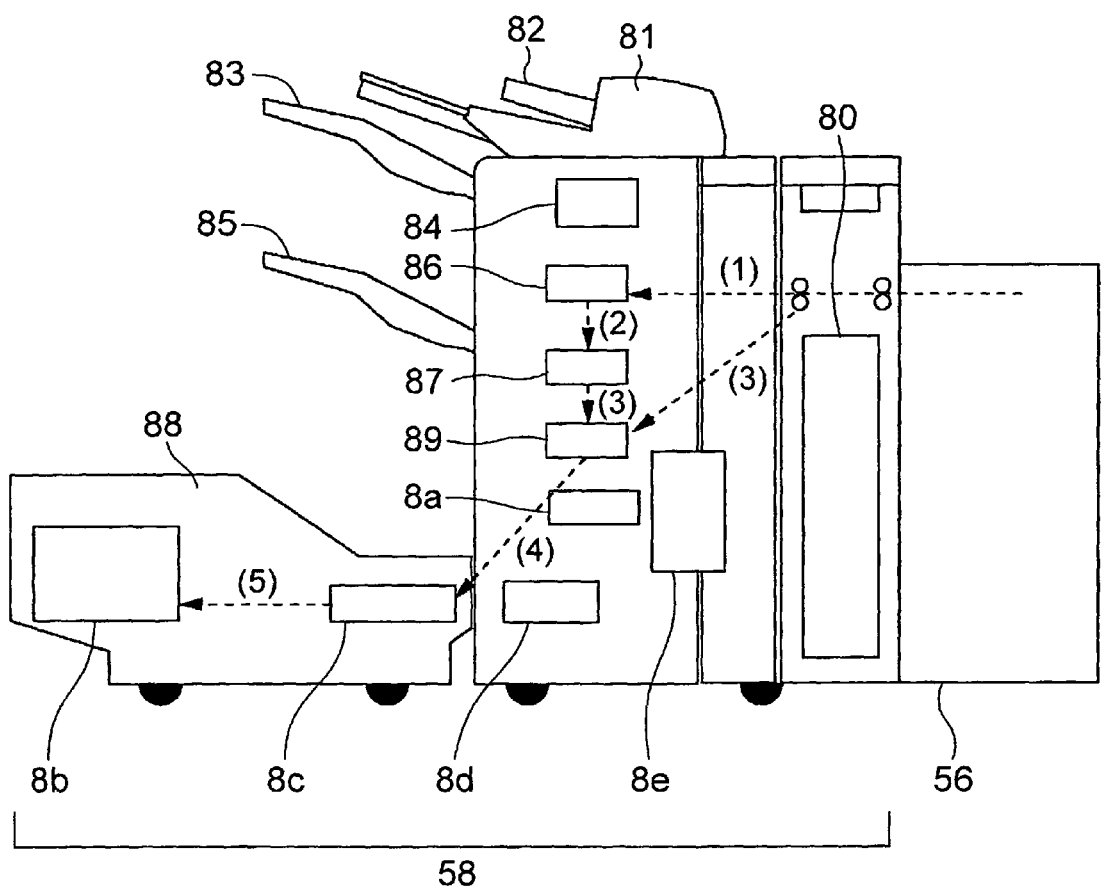
FIG. 8 is a diagram for describing a process in a related-art finisher.

A description will be given of a conveyance path for the print original at the time of "wrapping binding" in the related-art finisher device. FIG. 8 is a cross-sectional view of the post-treatment system, showing the construction of the inline finisher section. First, each of the components in the finisher device will be described.

The print original discharged from a fixing section of the printer section enters an inline finisher section when the fixing section is connected to an inline finisher 58. The printer section refers to a device main body 56 in FIG. 8. Hereinafter, the same holds true throughout the description related to FIG. 8. The inline finisher section includes a sample tray 83 and a stack tray 85, the original is discharged according to the type of the print job and the number of the print originals to be discharges. When a staple mode is set for the print out to be output, such a control is conducted that the original is stapled by a stapler 8a, and then the original is discharged to the stack tray 85. In addition, before reaching the above-mentioned two trays, there are arranged a z-folding machine 80 for folding a sheet of paper into a Z shape and a puncher 84 for making two (or three) holes for filing, the respective jobs are performed appropriately on the basis of the job type. Furthermore, a saddle stitcher 8e binds the center of the print original at two positions, and thereafter the center of the print original is folded half through a roller to create a booklet like a brochure (book binding process). The print original of the book bound by the saddle stitcher 8e is discharged to a booklet tray 8d.

With use of an inserter 81, the print original set in an insert tray 82 is conveyed to one of the stack tray 85 and the discharge tray such as the sample tray without intermediation of the printer section. The inserter 81 can insert (slip in) the print original set at the insert tray 82 between the print originals conveyed to the inline finisher section (the print originals printed by the printer section).

Next, a trimmer (trimming machine) 88 will be described. The output result made into the saddle stitched booklet by the saddle stitcher 8e enters the trimmer 88. At this time, first of all, the output result of the booklet is paper-fed by a length predetermined by a roller, and cut by the predetermined length by a cutter section 8c, whereby uneven end parts of the plural pages in the booklet are trimmed neat. Then, the booklet is stored in a booklet holding section 8b.

Finally, the case of the wrapping binding process and the conveyance path for the print originals will be described. Firstly, the print originals constructing the main body are discharged from the printer section, a primary tray 86 hold the print originals for only one booklet (by the number of pages for one booklet constructing the book binding print) (conveyance path 1). After the originals for one booklet are accumulated, the originals are conveyed to a gluing process section 87 while being aligned (conveyance path 2) and a surface formed by the spines of the originals is glued. At the same time of the gluing process, the cover original is discharged from the printer section and set to a wrapping binding process section 89 (conveyance path 3). After the gluing process on the originals is finished and the cover original is set, the glued originals are conveyed to the wrapping binding process section 89 (conveyance path 3) where the cover original wraps the originals. The originals having been subjected to the wrapping binding are conveyed to the cutter section 8c (conveyance path 4), where the end parts of the originals are cut off. Then, the originals are stored in the booklet holding section 8b (conveyance path 5). It is known that the original paper output from the related-art image processing apparatus is subjected to the book binding process (stabling, punching, saddle stitching binding, wrapping binding, etc.) by the finishing device.

First Embodiment

Figure 9:
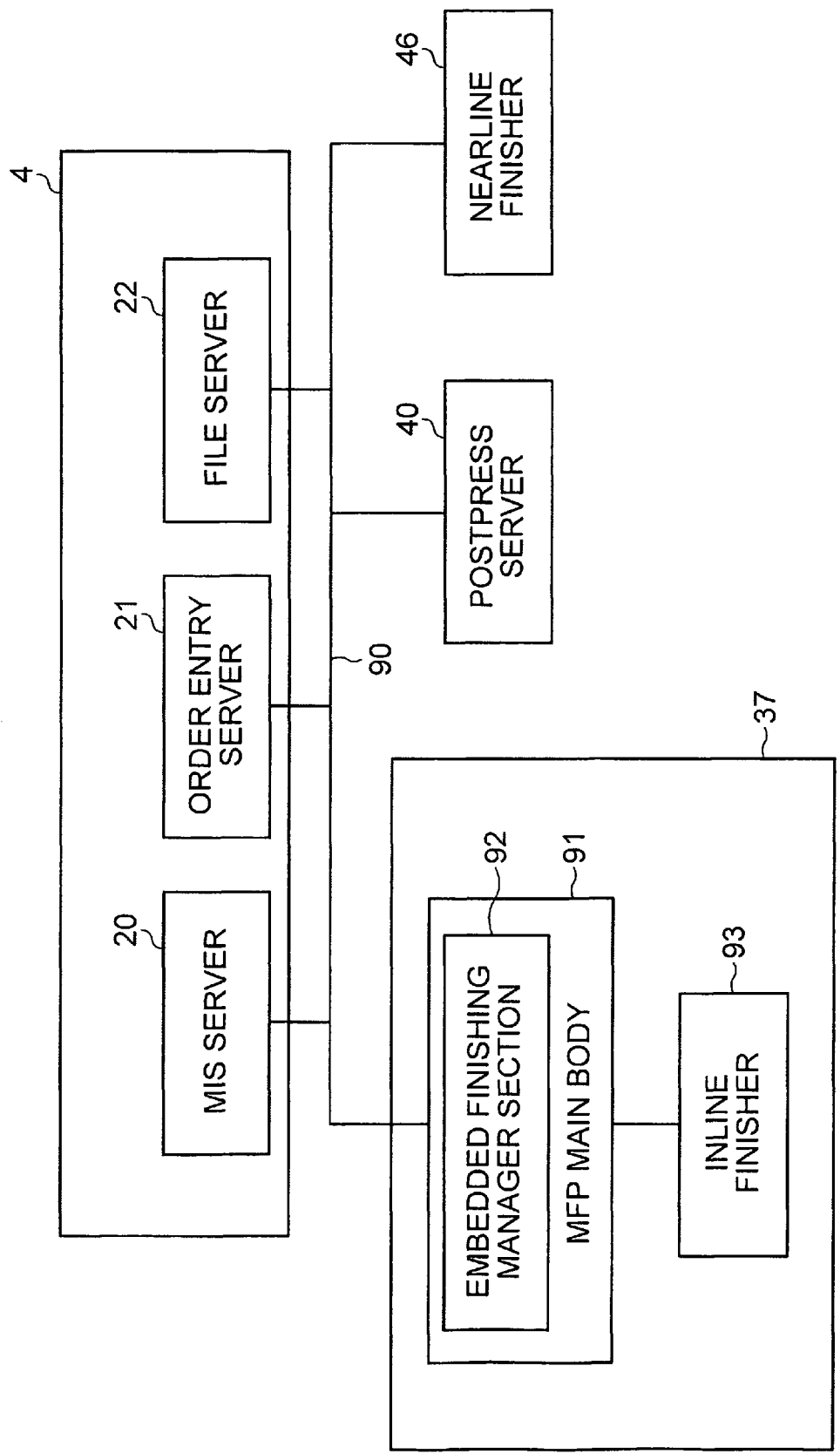
FIG. 9 is a construction diagram of a printing system according to a first embodiment of the present invention.

FIG. 9 is a block diagram showing an example of the basic construction of the whole printing system according to a first embodiment of the present invention. FIG. 9 is a block diagram obtained by omitting unnecessary components of the block diagram showing the basic construction of the whole printing system in FIG. 1 to leave the necessary components for describing the present invention. Hereinafter, FIG. 9 is used for describing the embodiment.

In this embodiment, the MIS server 20, the order entry server 21, and the file server 22 construct the process flow management section 4 in the printing system. Then, the digital print section 5 is composed of the color MFP 37, and the internal construction includes an MFP main body section 91 for executing the steps up to the output of the print original in which the drawing data is output in accordance with the instruction content of the JDF, and an inline finisher 93 for executing the post-treatment for the print original output from the MFP main body section 91. Moreover the color the MFP main body section 91 includes the embedded finishing manager section 92 (hereinafter, referred to as EFM).

The EFM 92 performs transmission and reception of the MIS server 20 and the JDF, notifying the MIS server 20 of the process status, obtaining the status of the MIS server 20 or the status of other MFP or the nearline finisher connected to the network, and the like. The PostPress section is composed of the PostPress server 40 and the nearline finisher 46 (for example, the wrapping binding machine). The PostPress server 40 transmits the status of each data in the PostPress section to the MIS server 20 and the EFM 92 and receives the JDF from the EFM 92. Then, the devices such as the MIS server 20, the color MFP 37, and the PostPress server 40 are connected via a network 90 such as a LAN. In this embodiment, the MIS server 20 manages the work flow of the entire system from the order entry to the delivery. The specific process content of the work flow management includes transmission of the order from the order entry server 21 to the MIS server 20 and storage of the order. Then, the MIS server 20 possesses the function of managing the process schedule for the print job of the whole printing system, whereby on the basis of the order transmitted from the order entry server 21 the JDF is created and managed in a process schedule information as the JDF to be processed in the printing system.

Moreover, in accordance with the above-mentioned process schedule, the MIS server 20 transmits the JDF to the digital print section 5 to instruct the starting of the print job, and receives the current process status information from the digital print section. The MIS server 20 also receives notification of the ending of the print job from the digital print section 5, and transmits to the PostPress section 6 the JDF instructing the finishing process on the print original output in the digital print section 5. After that, the MIS server 20 receives notification of the ending of the finishing process status information or the finishing process from the PostPress section 6. Then an operator is notified of the various pieces of information thus received via a CRT connected to the MIS server 20 or a CRT connected to the client PC 23.

Figure 10:
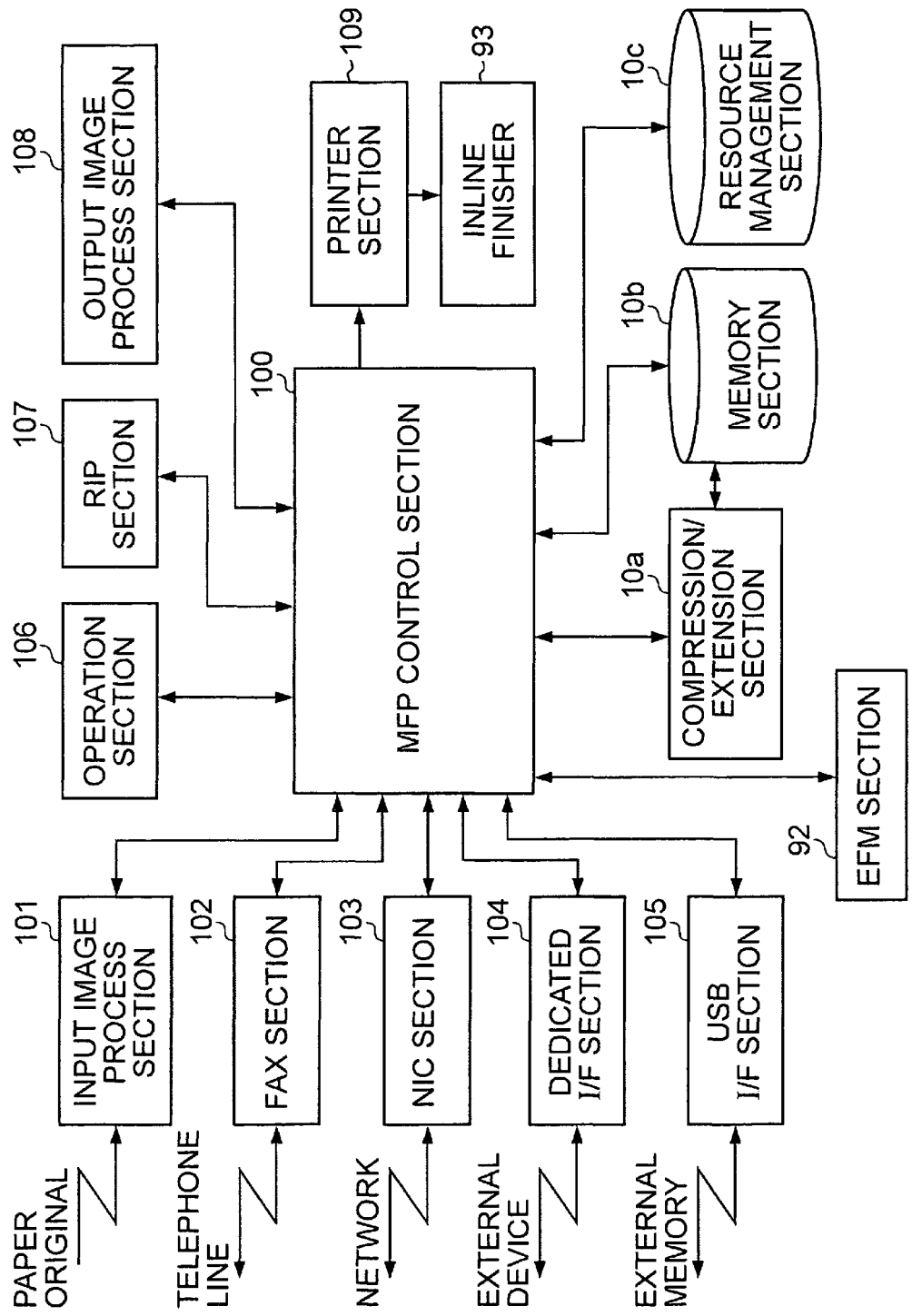
FIG. 10 is a detailed block diagram of an MFP according to the first embodiment.

FIG. 10 is a block diagram for describing the color MFP 37 in detail. The MFP is an image processing apparatus including a memory section 10b such as a hard disk drive capable of storing data related to the plural print jobs in the device itself, and having a copy function capable of printing data input from the scanner via the memory section 10b at the printer section and a print function capable of printing data output from an external device such as a computer via the memory section 10b at the print section. It should be noted that the print job described herein is equivalent of the JDF when the print job flows through a network outside the MFP, and the print job processed in the MFP is a format that can be executed by the MFP control section. For example, when the print job is composed of the JDF and the print content data, the print content data is processed in accordance with the JDF.

The MFP is classified into a full-color machine and a monochrome machine. The MFP 37 of FIG. 9 according to the present invention is treated as the color MFP. Also, regarding the construction of the printing system, as described above, the MFP has a plurality of functions. However, the construction may be the image processing apparatus only having the print function and the finishing function, or the image processing apparatus only having the print function. The construction may have a plurality of apparatus of any types. In any case, any construction is accepted as long as the control of this embodiment can be realized.

As shown in FIG. 10, the MFP includes an input image process section 101 for reading an image of the paper original or the like and performing image processing on the read image data, a FAX section 102 for performing transmission and reception of the image by using a telephone line represented by a facsimile, a network interface card (NIC) section 103 for exchanging the image data and the device information by using the network, a dedicated interface section 104 for exchanging information such as the image data with an external device. Alternatively or in addition, the MFP includes a universal serial bus memory (hereinafter, referred to as USB in this specification, and it should be noted that the USB refers to one kind of removable media), which represents a USB device, and a USB interface (USB I/F) section 105 for transmitting and receiving the image data, and the like. Then, an MFP control section 100 controls traffic depending on an application of the MFP, such that the image data is temporarily stored, and a path for the data is determined, for example.

Next, the memory section 10b is a memory such as a hard disk drive for storing plural pieces of the image data. For example, the control section of the image processing apparatus (for example, the MFP control section 100) takes the lead to perform the following process. It should be noted that the MFP control section 100 is a processor not shown in the drawing and can execute a predetermined program by using, for example, a RAM, a hard disk drive, etc. The MFP control section 100 stores in the memory section 10b the image data from the input image process section 101, the image data of the facsimile job input via the FAX section 102, the image data input via the NIC section 103 from an external device such as a computer, and plural kinds of image data input via the dedicated I/F section 104 and the USB I/F section 105. Furthermore, the MFP control section 100 appropriately reads out the image data stored in the memory section 10b, transfers the data to an output section of the printer section 109 or the like, and executes the output process such as the print process by the printer section. Also, the MFP control section 100 transfers the image data read from the memory section 10b to the external device such as the computer or other image processing apparatus in accordance with the instructions from the operator. The MFP control section 100 as necessary controls a compression/extension section 10a for storing the image data through compression to store the image data in the memory section 10b or alternatively for extending the compressed image data into the original image data to read out the compressed and stored image data. In addition, when the data is transmitted via the network, it is generally known that the compressed data in JPEG, JBIG, ZIP, or the like is used. After the data is input in the MFP, the data is extracted (extended) by the compression/extension section 10a. Furthermore, a resource management section 10c controlled by the MFP control section 100 stores commonly treated various parameter tables such a font, a color profile, and a gamma table, etc. The resource management section 10c can call the various parameter tables when necessary, store new parameter tables, correct the tables for update.

Next, when the PDL data is input, the MFP control section 100, the RIP section 107 performs a process on the data with a raster image processor (hereinafter, abbreviated as RIP). Also, for the image to be printed, an output image process section 108 performs an image process on the image for the print as necessary. Moreover, intermediate data of the image data created at that time or print ready data (bit map data or compressed data thereof for the print) can be stored in the memory section 10b again if needed. Then, the processed data is transmitted to a printer section 109 for image formation.

The print original printed out by the printer section 109 is conveyed to an inline finisher functioning as a post-treatment section, where sorting process and finishing process are performed.

Here, the MFP control section 100 plays a role of smoothing the job flow to switch paths according to the use of the MFP. An example shown below is used for the purpose of understanding a rough flow, where processes by the compression/extension section or the post-treatment section to be used when necessary, or processes by the MFP control section that is the core of the whole system are omitted.

Fax reception function: the FAX section→the output image process section→the printer section Network print: the NIC section→the RIP section→the output image process section→the printer section Print from external device: the dedicated I/F section→the output image process section→the printer section Print from external memory: the USB I/F section→the RIP section→the output image process section→the printer section Box print function: the memory section→the printer section It should be noted that the box print is a process function of the MFP using the memory section 10b. The function includes dividing the memory in the memory section 10b for each job or each user, temporarily storing the data, and inputting and outputting the data by combining a user ID and a password.

Moreover, an operation section 106 is adapted to select the above-mentioned various flows and functions and instruct the operation. Along with the achievement of a high resolution in a display device of the operation section, the image data in the memory section 10b is previewed and then can be printed after the checking when the data is judged satisfactory.

Moreover, the MFP according to the present invention includes the EFM section 92. The MFP control section 100 controls the print job to be processed inside the MFP, and the EFM section 92 controls transmission and reception of the JDF with an external device such as the MIS server 20 and the PostPress server 40 to execute analysis of the JDF, instruction process for the MFP control section 100, and the like.

Figure 11:
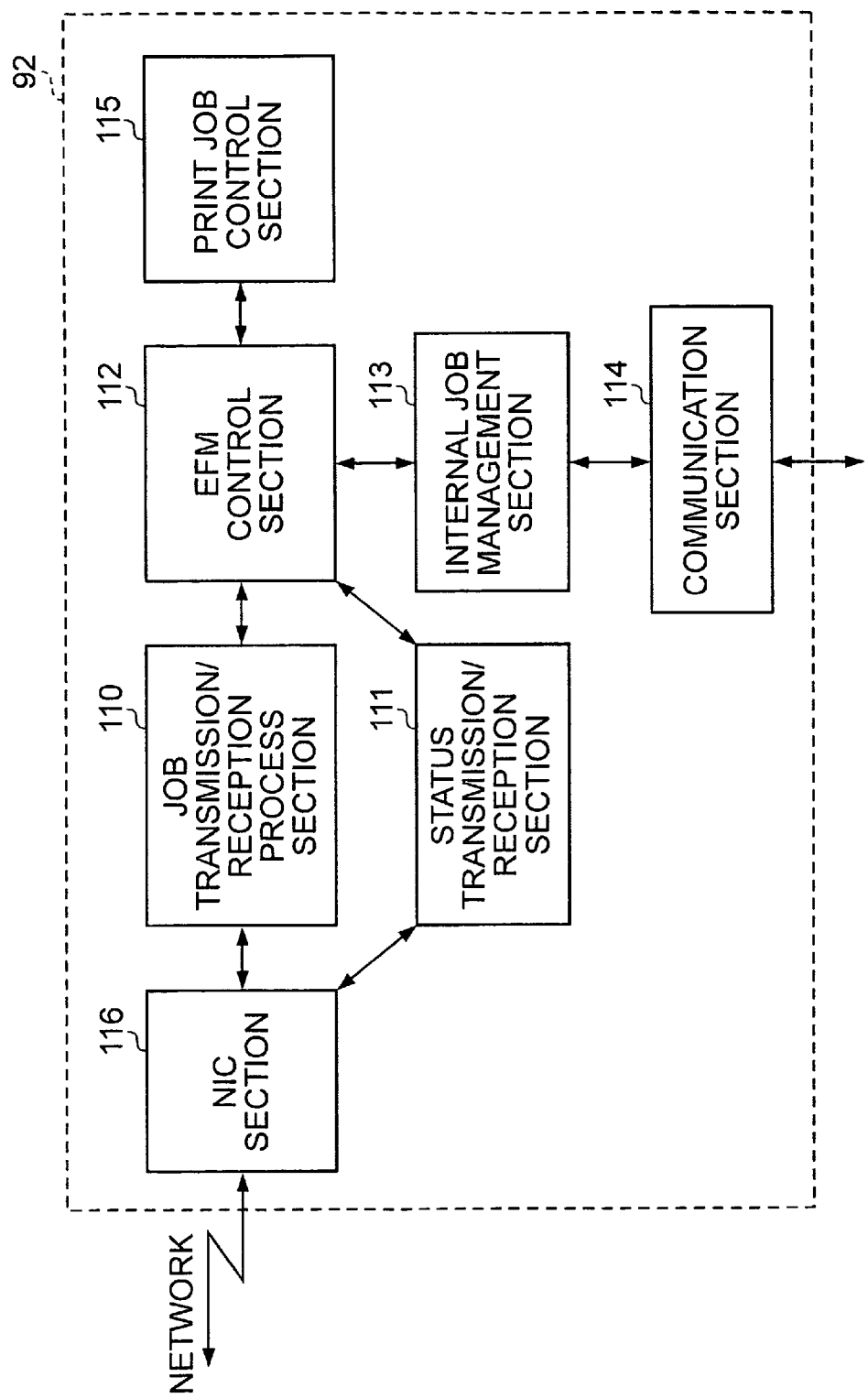
FIG. 11 is a block diagram of an EFM (embedded finishing manager) according to the first embodiment.

FIG. 11 is a block diagram for describing the EFM (embedded finishing manager) section 92 in detail.

The EFM performs transmission and reception of the JDF with an external device and transmits a status of the MFP managed by the EFM to each device in the printing system, or alternatively receives a status of an external device and transmits the received JDF to the MFP control section 100 for instructing starting of the print job. Then, the EFM 92 includes functions of instructing the MFP control section 100 to interrupt or terminate the print job process through an instruction from the MIS server and a determination of the EFM 92 itself, receiving the schedule information from the MIS, and editing the print job. In this embodiment, the EFM 92 is a module for processing transmission and reception of the JDF with an external device, and constitutes a device for receiving from the file server 22 the print content data (for example, the PDL data and the image data) to be printed in accordance with the instruction of the received JDF, and executing the print process while managing the entire MFP device.

The EFM 92 of FIG. 11 is the entire EFM section, and denoted by reference numeral 116 is an NIC section 116, where transmission and reception of the print content data or the JDF and transmission and reception of a status of are performed via the network. A job transmission/reception process section 110 controls transmission and reception of the JDF or print content data by instructing the NIC section 116. A status transmission and reception 111 obtains a status of an external device by instructing the NIC section 116 and transmits a status of an MFP device 37 to an external device such as the MIS server 20. A communication section 114 issues instructions for transmission and reception of the JDF and the print content data with the MFP control section 100, obtaining of the status, and execution of the print job. An internal job management section 113 is an internal job management section for managing the print job being processed in the MFP 37 and transmitting the process instruction of the print job via the communication section 114 to the MFP control section 100. A print job control section 115 performs a process for analyzing the instruction described in the JDF, changing the description of the JDF, or creating a description of the JDF. It should be noted that when the print job control section 115 analyzes the JDF received from the MIS server, it is possible that an instruction of the print process is performed on the MFP control section 100 and the print content data to be processed this time is recognized. When the print job control section 115 transmits the recognized print content data to an EFM control section 112 to be described later and the EFM control section 112 controls the job transmission/reception process section 110, the print content data as the process target is obtained from the file server. In this specification, it is assumed that the EFM 92 receives the print content data, but the construction should not be limited to the above. By notifying the MFP control section 100 of the description of JDF analyzed by the EFM 92, the MFP control section 100 may obtain the print content data from the file server. The EFM control section 112 is the EFM control section for controlling the entire EFM, and transmits the process instruction to each control section of the EFM.

Figure 12:
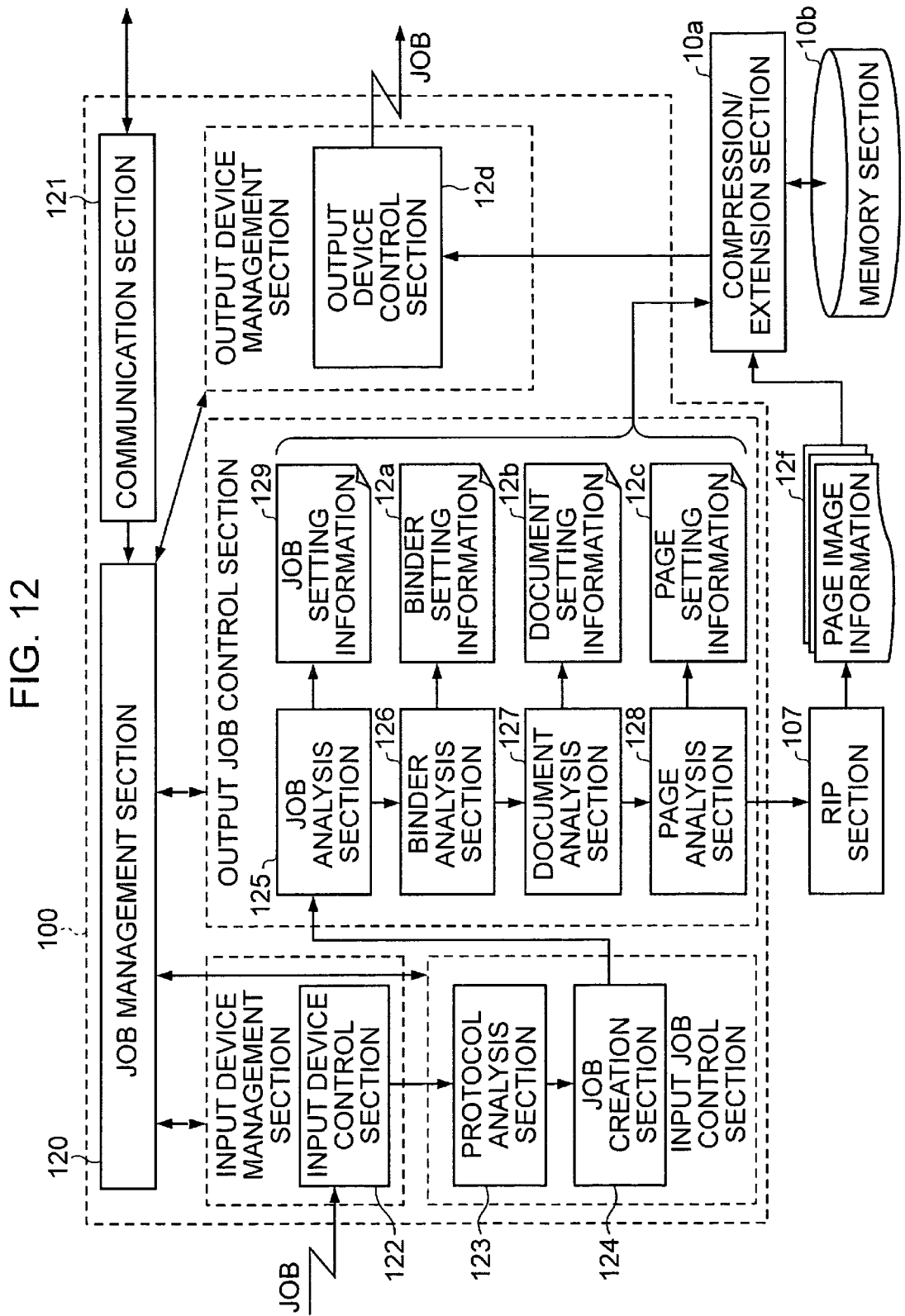
FIG. 12 is a block diagram of an MFP control section according to the first embodiment.

FIG. 12 is a block diagram for describing the MFP control section 100 in detail. FIG. 12 is roughly structured by the following five parts: an input device control section for controlling an input device, an input job control section for analyzing an input job an input device, an output job control section for sorting set information of the job, an output device control section for allocating an output device, and a job management section for transmit an instruction from the EFM 92 to the MFP control section 100 to control the print job.

The input device control section play a role to sort input signals from the respective input sections shown in FIG. 10 (101 to 105) and determine the order of switching. An input device control section 112 in the input device control section controls the input device control section to play the above-mentioned role. It should be noted that the input signals include the PDL data and the image data from the file server 22, the JDF from the job management section 120, and the like. It should be noted that the JDF received by the MFP control section 100 from the EFM 92 is converted by the EFM 92 into a JDF command to be analyzed by the MFP control section 100.

Next, the input job control section is composed of a protocol analysis section 123 and a job creation section 124. A series of operation instructions transmitted from the input device control section are received in the form of the command signal called command (protocol). The outline of the operation instructions is analyzed by the protocol analysis section 123 and converted into an operational procedure to be understood inside the MFP. On the other hand, the job creation section 124 creates an internal job for describing how the process is performed in the MFP. In the created internal job, a scenario for describing how the process is performed in the MFP and where the job is transmitted is defined, and in accordance with the scenario, the job flows in the MFP.

In the output job control section, a job analysis section 125, a binder analysis section 126, a document analysis section 127, and a page analysis section 128 create setting information of the job and image information. The job analysis section 125 analyzes the detail of job setting information 129 related to the entire job such as a document name to be printed, the number of copies, specification of a paper discharge tray at the output destination, and a binding order of the job composed of a plurality of binders. The binder analysis section 126 analyzes the detail of binder setting information 12a related to the entire binding such as setting of a binding method, a position of a staple, a document order of a binder composed of a plurality of documents. The document analysis section 127 analyzes the detail of document setting information 12b related to the entire document such as a page order of the document composed of a plurality of pages, specification of a double-sided print, addition of the cover or board lamination. The page analysis section 128 analyzes the detail of page setting information 12c related to the entirety of the various page settings such as the resolution of the image and the direction of the image (landscape/portrait) and when the PDL data is input, the RIP section 107 is called to perform a rasterizing process as well. It should be noted that to create the image information, the RIP section 107 is called to create page image information 12f through the rasterizing process. The image information 12f is compressed by the compression/extension section 10a and then associated with the setting information by the memory section 10b.

The output device control section is composed of an output device control section 12d. The image information stored in the memory section 10b is extended in the compression/extension section 10a and read out together with the associated setting information. The setting information and the image information are transmitted to the output device section as a pair. The output device control section 12d performs scheduling for processes in the MFP to determine which device is used among the printer section, inline finisher, and the like in the MFP.

A communication section 121 receives the process instructions of the print job such as transmission and reception of the JDF or print content data with the EFM 92 and transmission and reception of the print status.

A job management section 120 receives the JDF via the communication section 121 from the EFM 92 and receives instructions of starting, interruption, or termination of the print process or change of the process content. In accordance with the instruction content from the EFM 92, an instruction of changing the print job process is transmitted to each control section inside the MFP and a status of the print job being executed in the MFP is transmitted to the EFM 92.

Figure 13:
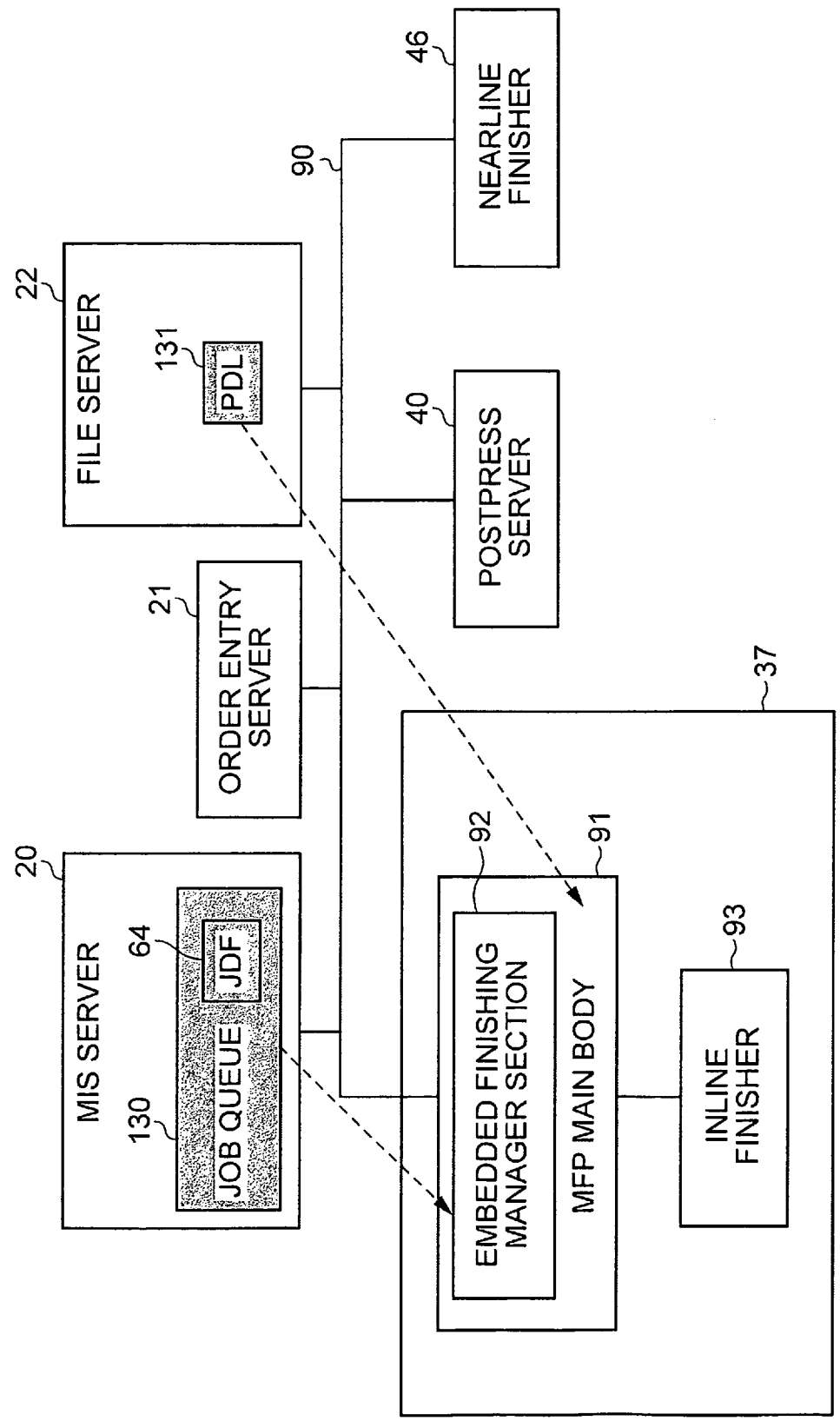
FIG. 13 is a diagram for describing starting of a print job according to the first embodiment.

FIG. 13 is a diagram for describing the case where the print job is first received by the digital print section from the process flow management section according to this embodiment.

The MIS server possesses the schedule of the job process in the printing system. The schedule includes information about a delivery period of the print job and the delivery date and information about from when to when which device performs which process according to an operating schedule of the printing system. It should be noted that the MIS server may automatically create the schedule. Operations to be processed in the MFP 3 are based on the information described in the JDF, and the JDF is created by the MIS server. In this specification, the print content data (PDF data, etc) to be actually processed is recorded in the file server. The JDF data and the print content data are created on the basis of data (order) on the print order entry transmitted from a client. This creation process is a process generally conducted in the commercialized printing industry, and is no related to any process of the present invention, so the detailed description thereof is omitted.

The MIS server possesses a job queue 130 to set the job queue in the JDF whose process starting time has come in accordance with the schedule. Also, in accordance with the schedule, the JDF 64 is transmitted from the job queue to the EFM in the digital print section. It should be noted that in this specification, such a construction is assumed that print content data 131 is recorded in the file server and the EFM 92 having received the JDF 64 analyses the JDF 64, whereby the print content data associated with the JDF 64 is recognized and transmitted from the file server 22 to the MFP main body. It should be noted that the print content data described in this specification is data to be drawn on the recording medium, so the data may be called drawing data in some cases.

Figure 14:
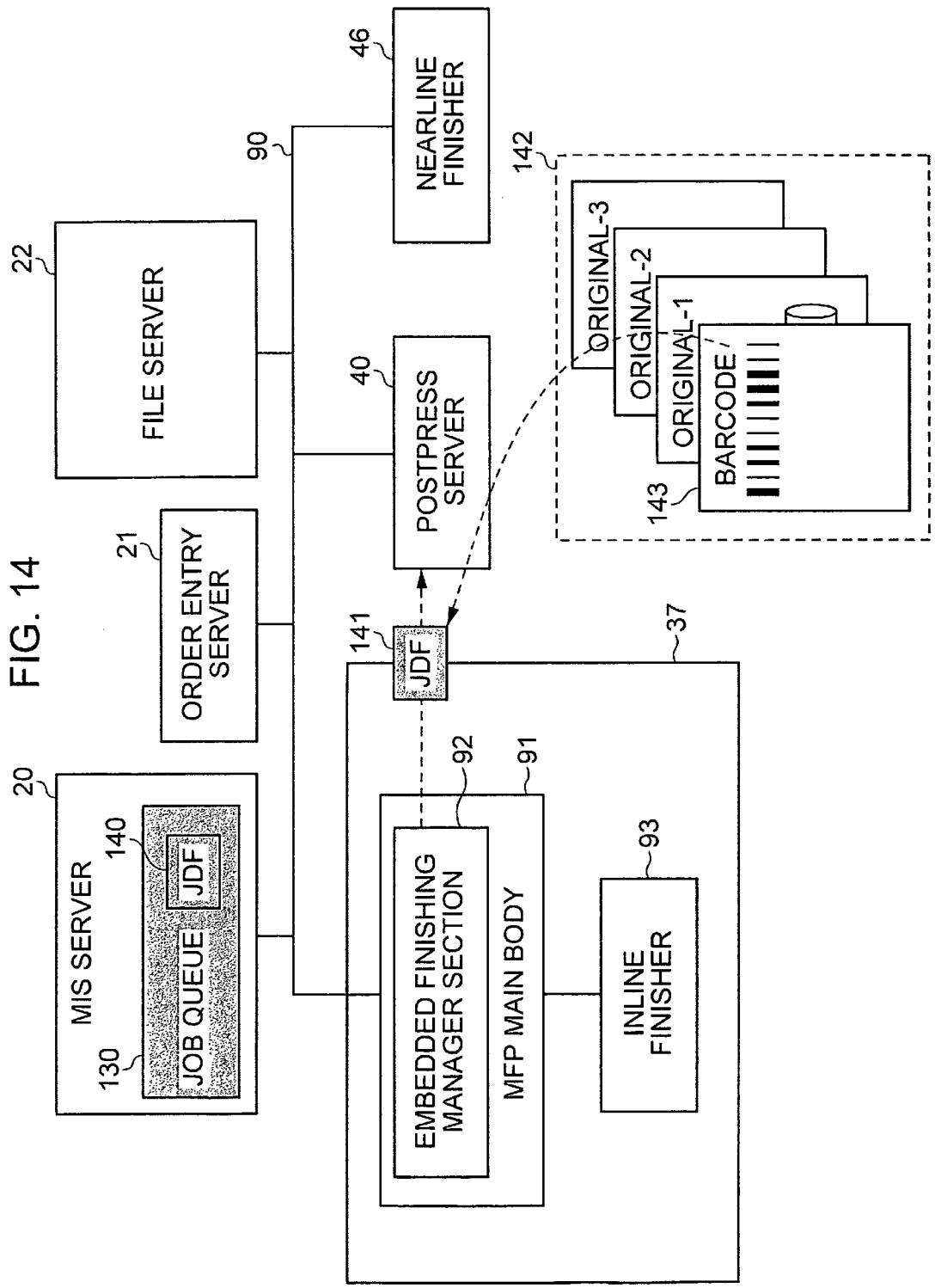
FIG. 14 is a diagram for describing a print job alternation process according to the first embodiment.

FIG. 14 is a diagram for describing an alternation request process of the finishing process from an inline finisher provided in the MFP 37 to a nearline finisher when the print content data is processed in accordance with the instruction content of the JDF received by the MFP 37 of this embodiment.

When the MIS server 20 realizes that the process starting expectation time has come in accordance with the schedule, the JDF 140 that is set in the job queue to be processed by the MFP 37 is transmitted to the MFP 37. However, in FIG. 14, as the print job corresponding to the previous JDF is being processed by the MFP 37, the JDF 140 is not transmitted to the EFM 92 due to the job queue in the MIS server, and accordingly the standby situation is indicated.

In order to perform the job alternation of the finishing process from the inline finisher of the MFP 37 to the nearline finisher 46, a JDF 141 is created (or changed) for the job alternation process by the EFM 92 to be transmitted to the PostPress server 40. The JDF 141 will be described in detail with reference to FIG. 15.

Denoted by reference numeral 142 is a print original output from the MFP 37, which shows the entire print original subjected to the finishing process by the nearline finisher 46. A JDF identification original 143 is output to an uppermost position of the print original 142 where the operator can easily recognized this original. The JDF identification original 143 describes information indicating the JDF 141 by way of identification information (barcode), and other than that, the JDF identification original includes the print content data and the print original products output on the basis of the JDF. The identification information described in the JDF identification original 143 (corresponding to the barcode in FIG. 14) associates the JDF 141 transmitted to the PostPress server 40 via the network and the print original 142, which is the content indicated by the JDF 141. When the process is started by the nearline finisher 46, the operator firstly makes the barcode described in the JDF identification original 143 be recognized through a scan process or the like, whereby the print original 142 to be subjected to the print post-treatment by the nearline finisher 46 are associated with the JDF 141 that the PostPress server 40 has received from the EFM 92. As a result, when the operator just sets the print original in the nearline finisher 46, the nearline finisher 46 executes the print post-treatment on the basis of the operational instructions described in the JDF 141. It should be noted that this link processing (associating process) with the barcode is not within the scope of the present invention and is an already implemented embodiment, so further description is omitted in this embodiment.

Figure 15:
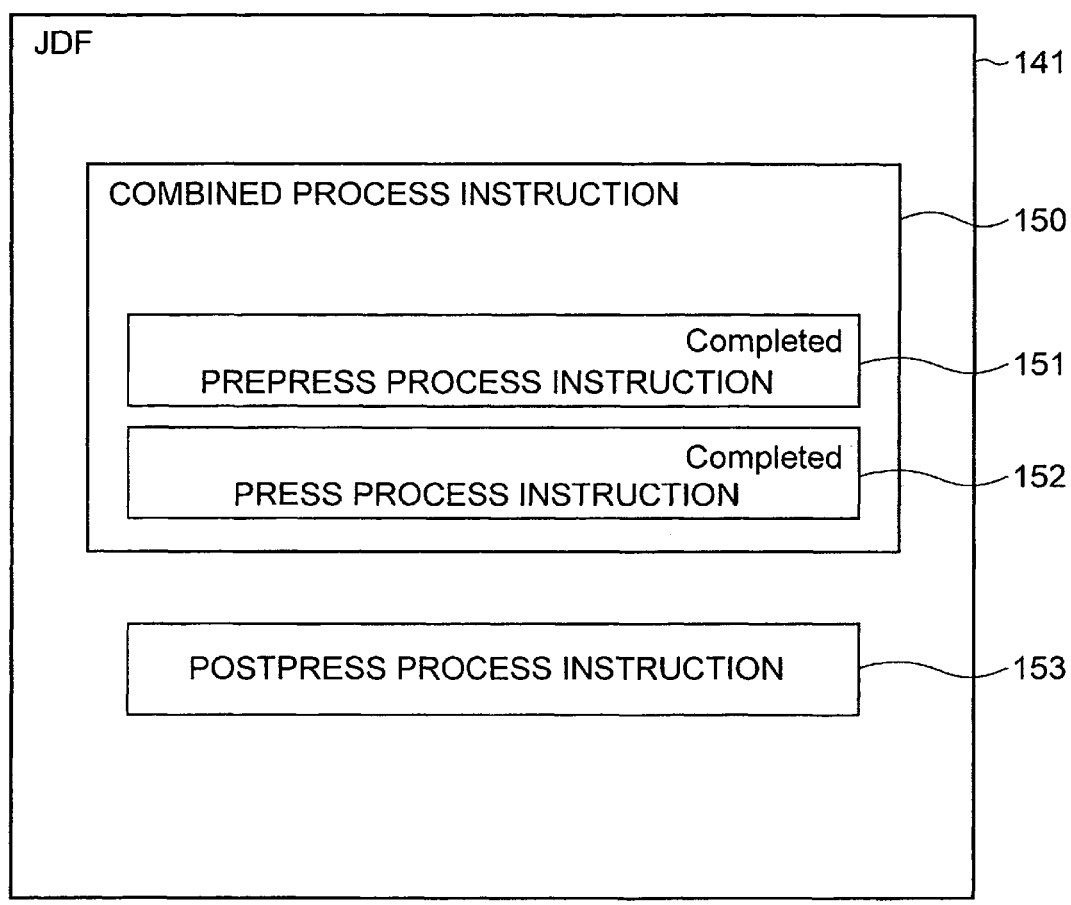
FIG. 15 is a diagram for describing a JDF at the time of requesting print job alternation according to the first embodiment.

FIG. 15 is a diagram for describing the JDF 141 transmitted to a postpress server for a job alternation request from the MFP 37 to the nearline finisher.

Firstly, regarding the JDF 64 instructed from the MIS server to the MFP, the description has been given with reference to FIG. 6 as the related-art example. Here, a difference from the JDF 64 shown in FIG. 6 will be mainly described.

According to the JDF 64 shown in FIG. 6, the PrePress process instruction 61, the Press process instruction 62, and the PostPress process instruction 63 are specified in the combined process 60. This means that the MFP specifies the process from the PrePress process instruction 61 to the PostPress process 63 to be executed at once. When the MFP 37 follows the content of the JDF 63, the process up to the PostPress process is executed. First of all, the MFP 37 starts the job process in accordance with the instruction described in the received JDF 64.

However, when the process starting time for the next job comes or an error such as shortage of a stapler of the finisher occurs, if the MFP 37 itself continues the process from the preprint process to the print post-treatment, there is a possibility of causing a significant delay in the schedule. In view of the above, by applying the present invention, the MFP 37 executes the process up to the print process, and the finishing process is performed by the nearline finisher instead of the MFP 37, thereby making it possible to prevent the process delay. At this time, when the MFP 37 requests the print post-treatment, the construction of the operational instructions described in the JDF are changed (or created). This situation is indicated by the JDF 141 of FIG. 15.

The JDF 141 described in FIG. 15 is different from the JDF 64 in description content, and a different numeral is given to show the difference. The PrePress process instruction 151 in the JDF 141 is an instruction used when the PrePress process is executed and the Press process instruction 152 is an instruction used when the Press process is executed. It should be noted that in FIG. 15, the PrePress process instruction 151 and the Press process instruction 152 are added with a mark "Completed" indicating of the end of the process as both the instructions are completed in the MFP 37. Then, the two instructions are left in the combined process 150, and the PostPress process instruction is moved out of the combined process 150. As a result, when the PostPress process server refers to the operational instructions described in the JDF 141, it is recognized that the process based on the PostPress process instruction 153 is unprocessed, making it possible to judge that the process based on the PostPress process instruction 153 is the process target to be executed by the external device. It should be noted that the altered work process steps are carried over to the external device of the job alternation target, and the output result has no change even when the device to be the process target is changed.

Figure 16B:
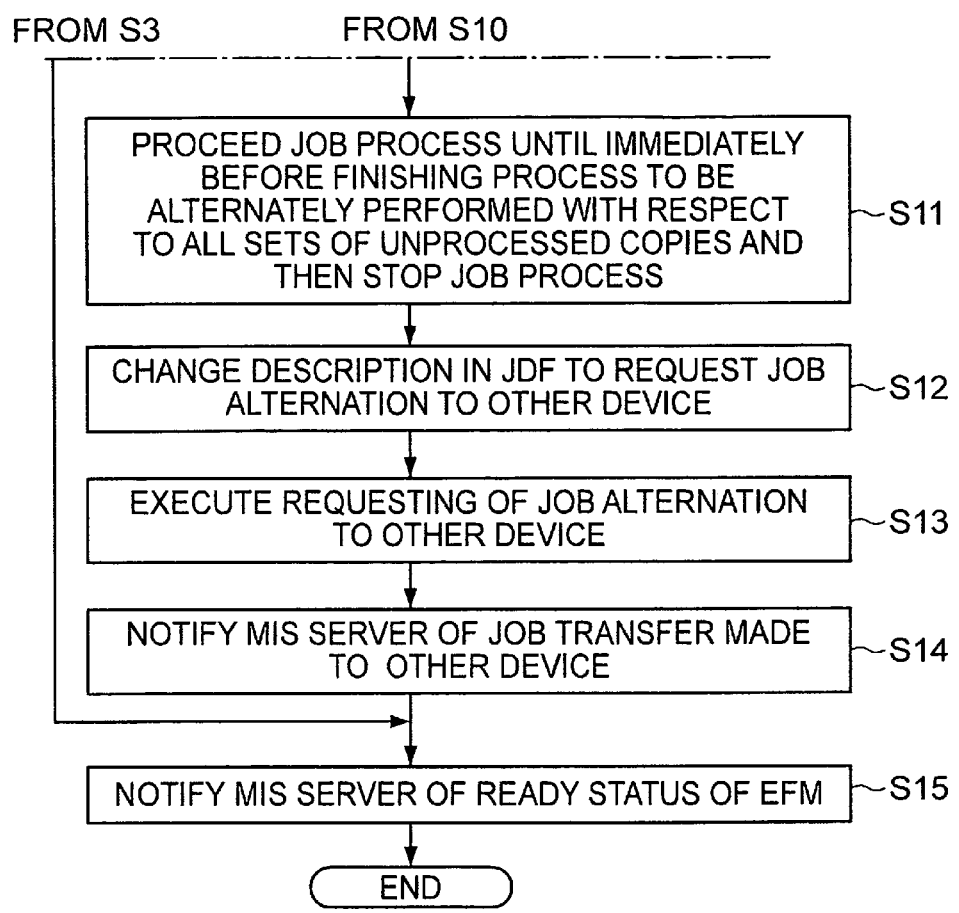

FIGS. 16A and 16B are flowcharts for describing the print post-treatment according to this embodiment the EFM process for requesting the job alternation to the nearline finisher. It should be noted that the respective steps in the flowchart described in the present invention are processed by the MFP control section 100 in the MFP.

In Step S1, the EFM 92 receives the JDF from the MIS server. The movement of the JDF at this time is shown in FIG. 13. It should be noted that the JDF received in Step S1 is stored in the memory section 10b.

Then in Step S2, the EFM 92 transmits the JDF and print content data in accordance with the instruction described in the JDF to the MFP control section 100 to instruct the process start. In detail, the JDF received by the EFM 92 as described above is analyzed by the print job control section 115. As a result, the EFM 92 can recognize print content data to be the process target, and the print content data is received from the file server. Then, the JDF data and print content data analyzed by the print job control section 115 of the EFM 92 is transmitted to the MFP control section 100, thereby starting the process in the MFP. It should be noted that the JDF and print content data transmitted to the MFP control section 100 is processed and managed in the MFP control section, and the detail thereof will be described with reference this embodiment shown in FIG. 17. The EFM 92 leaves the process of the print job to the MFP control section 100, and the EFM control section 112 in the EFM 92 executes the print job process to the end by the MFP 37 in the EFM 92 itself or the flow shifts to the monitoring whether the job alternation to other device is performed or not.

In Step S3, the EFM 92 judges whether or not the process for all the copies has been completed in accordance with the content instructed by the JDF. In detail, the internal job management section 113 in the EFM 92 recognizes the process condition in the MFP via the communication section 114, whereby the process in Step S3 can be executed.

In Step S3, when the EFM 92 judges that the process for all the copies has been completed, the flow proceeds to Step S15, and when the EFM 92 judges that the process for all the copies has not been completed, the flow proceeds to Step S4.

In Step S4, the EFM 92 inquires whether or not the JDF is queued standby in the job queue of the MIS server to be processed by the MFP 37 in the EFM 92 itself. In Step S5, it is judged whether the JDF whose process starting time has passed to be processed by the MFP 37 in the EFM 92 itself is still queued. When the JDF is not queued, the flow returns to Step S3, and when the JDF is queued, the flow advances to Step S6. In other words, when the EFM 92 analyzes the schedule information of the JDF to be processed by the MFP 37 obtained from the MIS server, it is judged whether there is caused a delay in the schedule. In detail, when the transmission and reception section 111 in the EFM 92 is communicable with the MIS server via the NIC section 116 and the EFM control section 112 analyses the schedule information received from the MIS server, it is possible to execute the processes in Steps S4 and S5. That is, on the basis of the judgments in Steps S4 and S5, the EFM 92 judges whether or not the work process steps to be processed by the image processing apparatus should be changed.

In Step S5, when the EFM 92 judges that the JDF whose process starting time has passed exists (when it is judged that the work process steps should be changed), in Step S6, the EFM 92 judges whether or not the finishing process has been instructed in the print job currently processed by the MFP 37, in other words, whether or not the PostPress process instruction has been described in the JDF. In detail, as the currently processed JDF is stored in the memory section 10b, the process Step S6 can be executed by referring to the memory section 10b by the EFM control section 112.

In Step S6, when the EFM 92 judges that the finishing process has not been instructed, there are no nearline finishers to which the job alternation can be requested. Thus, to continue the execution of the process in the MFP 37, the flow returns to Step S3. When it is judged that the finishing process has been instructed, the flow proceeds to Step S7. The EFM 92 judges whether or not the currently processed print job is in the finishing process by the MFP 37. It should be noted that recognition of the process condition in the MFP 37 is the same as that of Step S3, so the description thereof will be omitted.

In Step S7, when the EFM 92 judges that the currently processed print job is in the finishing process, the flow proceeds to Step S8. The currently processed the finishing process for xx-th copy is executed to the end, and the flow returns to Step S3 to judge again whether or not the process for all the copies has been finished. Here, when there is a copy to be processed, the flow proceeds to Step S9. In other words, the currently processed finishing process for xx-th copy is executed up to the print post-treatment, whereas judgment process in Step S9 described below will be conducted on the process for the rest of the copies to be executed.

In Step S7, when the EFM 92 judges that the currently processed print job is not in the finishing process, or when the flow proceeds to Step S8 and it is judged that the process for all the copies has not been finished, the process in Step S9 is conducted. In Step S9, the EFM 92 judges whether or not the finishing process described in the JDF can be executed by other external device (for example, a nearline finisher). It should be noted that the process in Step S9 is based on the judgment by the EFM 92 through reception of the process performance of an external device managed by the MIS server. In other words, the process is the judgment as to whether or not there is an external device capable of executing capable of executing at least one of the work process steps to be processed in the MFP 37, the detail of which will be described with reference to FIG. 18.

In Step S10, when it is judged that an external device cannot deal with the finishing process in the job alternation, the flow proceeds to Step S8 to execute the finishing process.

Subsequently, the process in the stated route Step S3→Step S10→Step S8 will be continued until the process for all the copies has been finished.

In Step S10, when the EFM 92 judges that there is an external device that can deal with the finishing process in the job alternation, in Step S1, the EFM 92 sets the output result for the rest of the copies to be processed as the job alternation target. Here, the finishing process as the job alternation target is executed without the inline finisher in the MFP 37, and therefore the EFM 92 instructs the MFP control section 100 to change the conveyance path of the print original from a conveyance path to the inline finisher 93 to a paper discharge tray. In response to this instruction, the MFP control section 100 discharges the sheet of paper without the finishing process even when the job is processed. For example, when the wrapping binding process is executed as the finishing process by using the wrapping binding process section 89, which is the inline finisher in the MFP 92, the print original for one booklet is first held in the primary tray 86 of FIG. 8. The destination of the original from here is not set to the conveyance path 2 for the inline finisher, and conducts a process to change the destination to the paper discharge tray (for example, the stack tray 85). As a result, although it is expected at the beginning that the print original is conveyed from the primary tray 86 to the wrapping binding process section 89, the print original is discharged to the stack tray 85. Next, the EFM 92 advances the job process immediately before the finishing process to be alternately performed for all the unprocessed print copies. Finally, the JDF identification original on which the barcode indicating the job ID number is indicated is printed to terminate the job process. In other words, the MFP 92 executes the print process for the unprocessed copies only without performing the finishing process, and the job ID number is thereafter printed in the form of barcode.

After that, the flow proceeds to Step S12, the EFM 92 creates (or changes) the JDF for the job alternation to the PostPress server 40 for requesting an external device (for example, the nearline finisher 46) to perform the job alternately. In other words, in the process, the job ticket is created (or changed) to cause the external device to execute the work process steps, which can be executed by the external device. It should be noted that the creation of the JDF includes a process of changing the JDF. In detail, the print job control section 115 shown in FIG. 11 changes the description of the JDF received from the MIS server. The JDF having been to the description change will be described in FIG. 15. When the JDF for the job alternation is created, the EFM 92 recognizes the finishing process as the work process step to be alternately performed. The creation of the JDF also includes a process of newly creating the JDF for the job alternation on the basis of the finishing step to be alternately performed. It should be noted that the created JDF for the job alternation is transmitted in Step S13.

The flow proceeds to in Step S13, where the EFM 92 transmits the changed (or created) JDF in Step S12 to the PostPress server 40. Then in Step S14, the EFM 92 notifies the MIS server 20 of the information that the process based on the JDF requested to the MFP 37 is transferred to the nearline finisher 46. Finally, in Step S15, to inform that the JDF queuing in the job queue of the MIS server 20 can be accepted, the MFP 37 notifies the MIS server 20 of the ready condition where there are no print job being processed.

With the process described in FIGS. 16A and 16B, when the EFM 92 realizes that there is occurred a delay based on the schedule received by the MIS server 20, a search is conducted to find an external device capable of alternately perform the finishing process. Here, when the external device capable of alternately performing the finishing process is found, the EFM 92 changes (or creates) the JDF to alternately perform the finishing process, making it possible to eliminate the schedule delay. Also, by using the EFM 92 of this embodiment, it is possible to execute the job alternation without stopping the process even when the job alternation is judged necessary during the process.

It should be noted that in this embodiment, the nearline finisher is exemplified as the external device capable of alternately performing the finishing process, but the construction is not limited to the above. As long as the function of alternately performing the finishing process is provided, no problem occurs. For example, the MFP device having the function of alternately performing the finishing process may conduct the job alternation process. Such a description has been given in Steps S4 and S5 of FIG. 15 that the MIS server is requested to perform the job alternation process on the bases of whether or not the JDF exists whose process time has passed. However, when the finishing process to be executed by the MFP 37 during the process actually cannot be executed by the MFP 37 (for example, in the case where there are no staples of the stapler provided to the MFP 37), as the EFM 92 recognized from the MFP control section 100 that the finishing process cannot be executed, the process in Step S6 and the subsequent process may be executed for the job alternation process.

Although the process in Step S13 of the flowchart shown in FIG. 16B describes that the changed (or created) JDF for the job alternation is transmitted to the PostPress server, the construction should not be limited to the above. For example, it is conceivable that the EFM 92 transmits the changed (or created) JDF for the job alternation to the nearline finisher to which the job alternation should be requested. It should be noted that in this case, the nearline finisher for executing the job alternation process includes a function of analyzing the JDF (EFM).

Figure 17:
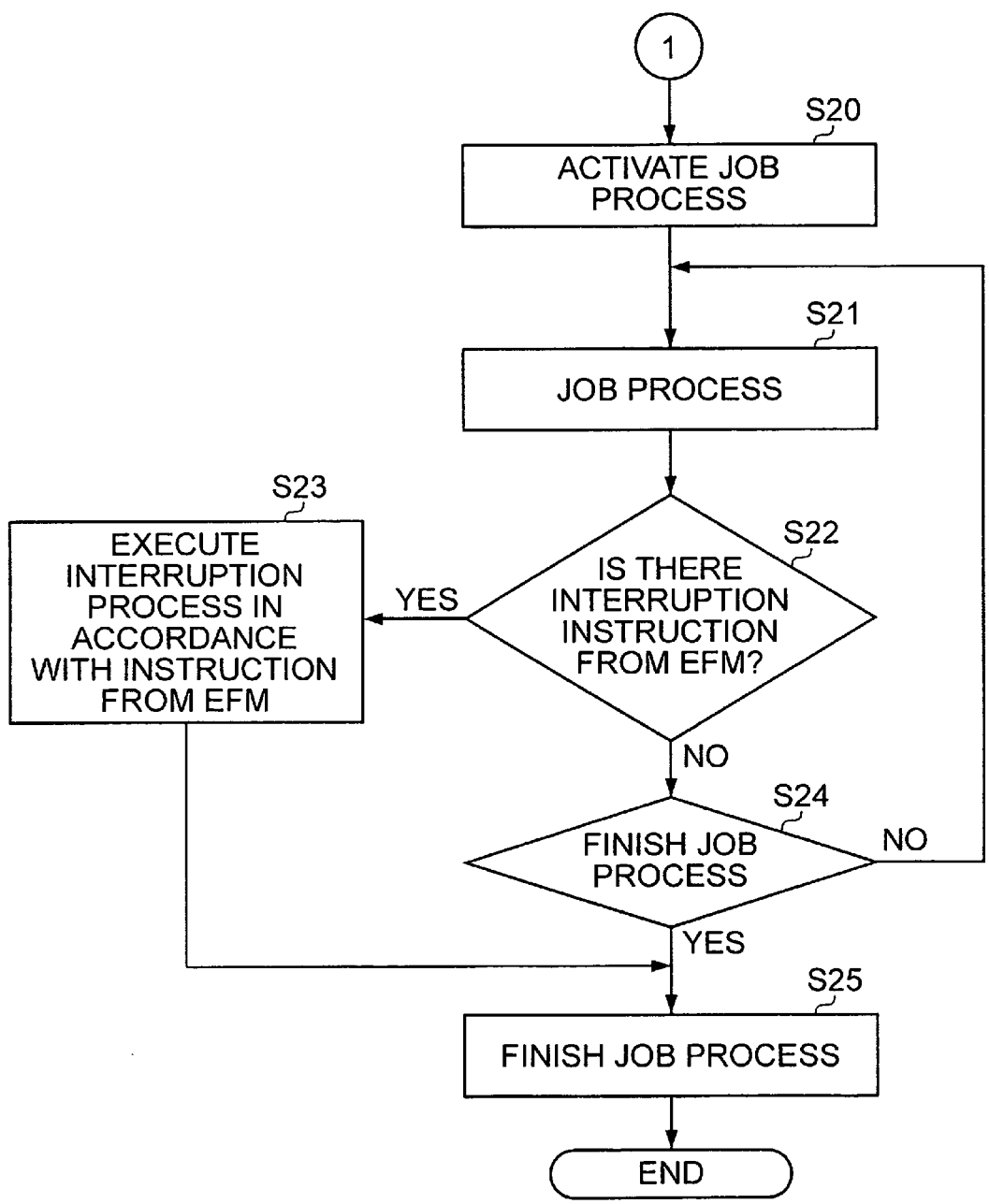
FIG. 17 is a second flowchart for describing the process of the first embodiment.

FIG. 17 is a flowchart for describing the process in the MFP control section during the process of the print job according to this embodiment.

In Step S2 of FIG. 16A, when the JDF and print content data is transmitted to the MFP control section 100 and the process start is instructed, Step 20 of FIG. 17 is started.

In Step S20, the MFP control section 100 creates the internal job for the MFP internal process to start the process on the basis of the internal job. In detail, the JDF analyzed by the EFM 92 for the MFP control section 100 is changed to the internal job by the input job control section in the MFP control section 100. It should be noted that the changed internal job is held in the memory section 10b.

In Step 21, the MFP control section 100 executes the print process in accordance with the content described in the JDF transmitted from the EFM 92. The process content is the same as that described in FIG. 12. In detail, as the internal job based on the JDF transmitted from the EFM 92 is held in the memory section 10b, when the MFP control section 100 refers to the memory section 10b, the process content can be recognized. Then, the MFP control section 100 controls each module in the MFP to execute the job process in accordance with the recognized process content.

Then, the flow proceeds to Step S22, the MFP control section 100 judges whether or not the job interruption instruction is transmitted from the EFM 92. In detail, as the job management section in the MFP control section 100 receives the instruction content from the EFM 92, when the input job control section refers to the job management section, the judgment process in Step S22 can be conducted.

In Step S22, when the MFP control section 100 judges that the interruption instruction has been made, the flow proceeds to Step S23 where the interruption process is executed in accordance with the instruction content from the EFM. For example, as shown in FIGS. 16A and 16B, the finishing process being executed is executed to the end, and only the print process is executed for the unprocessed copies. Finally, the instruction to print the JDF identification original indicating the print job ID is issued from the EFM, and this process is executed. In other words, to execute the job alternation process, when the interruption instruction is issued from the EFM 92, the process described in Step S23 is executed. The flow then proceeds to Step S25. It should be noted that in Step S22, there is no interruption instruction, the flow proceeds to Step S24, where it is judged whether or not the print job currently being processed in the MFP 37 has been finished. When the process has not been finished, the flow returns to Step S21, the process of the print job is advanced. When the process has been finished, the flow proceeds to Step S25.

In Step S25, the MFP control section 100 notifies the EFM 92 of the end of the job to perform an ending process such as clearing of the status in the MFP control section.

On the basis of the flowchart described in FIG. 17, it is possible to judge whether the MFP continues the process in accordance with the instruction from the EFM or interrupts the process.

Figure 18:
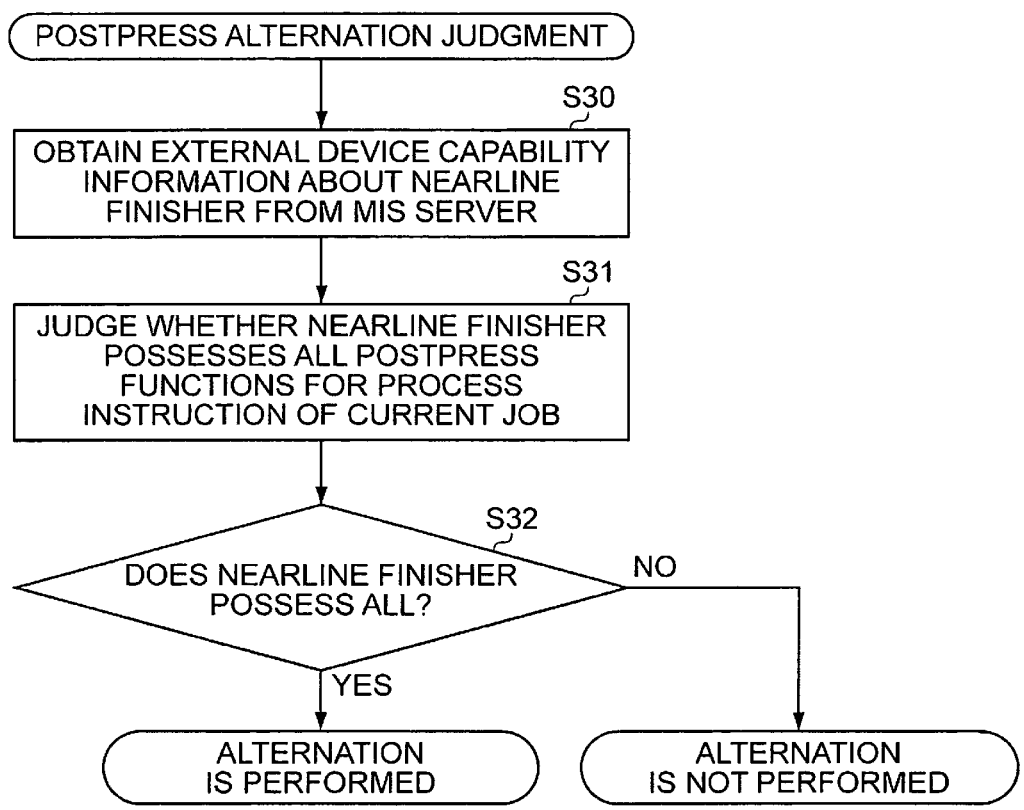
FIG. 18 is a third flowchart for describing the process of the first embodiment.

FIG. 18 is a flowchart for describing an example where it is judged whether or not the finishing process in Step S9 of FIG. 16A can be dealt with by an external device (for example, the nearline finisher) in the job alternation. FIG. 18 shows a method in which the EFM 92 receives external device performance information indicating the process performance of the external device (the nearline finisher) from the MIS server to judge on the job alternation availability. In this embodiment, the MIS server holds external device capacity information indicating the process performance of each device in the printing system. It should be noted that the flowchart describes an expected case where the nearline finisher is searched for as the job alternation target, but the construction is not limited to the above. Any external device may be used except the MFP managed by the EFM 92.

First of all, in Step S30, in the nearline finisher connected to the printing system stored in the MIS server 20, the EFM 92 obtains a list of all nearline finishers which are not performing the process and also are not scheduled to process any process later and information on external device capacities of the above-mentioned nearline finishers. In detail, the MIS server manages the information on the nearline finisher (for example, the performance of the device, the process condition, the connection status, the schedule information, and the like) in the memory section of the MIS server. The EFM 92 requests the MIS server 20 to obtain the external device capacity information, whereby the EFM 92 is notified of the nearline finisher information managed by the MIS server. The EFM 92 executes the process of Step S30 in accordance with the information informed from the MIS server.

Then in Step S31, from the thus obtained information relating to the nearline finisher, the EFM 92 judges whether or not there is a nearline finisher capable of alternately performing the function necessary for the PostPress process instruction described in the JDF corresponding to the print job currently being processed in the MFP 37. In detail, as the information on the nearline finisher obtained by the EFM 92 and the PostPress process content described in the JDF are stored in the memory section 10b, by referring to the memory section 10b and comparing the information on the nearline finisher and the PostPress process content with each other, the judgment in Step S31 can be conducted.

In Step S32, when the nearline finisher that possesses (or can alternately perform) the PostPress process content described in the JDF exists, the EFM 92 judges that the nearline finisher that can alternately perform the job alternation exists, the process in Step S11 of FIG. 16B and the subsequent process are executed. On the other hand, when there is no nearline finisher that possesses all the necessary functions, the EFM 92 judges that the nearline finisher that can alternately perform the job alternation does not exist, and the process in Step S8 of FIG. 16A is started. It should be noted that in FIG. 18, such a description has been given that a nearline finisher that can alternately perform the PostPress process is searched for, but a plurality of nearline finishers may be combined to alternately perform the PostPress process. For example, the representative roles of the binding machine include "stitching process" and "folding process", but the stitching machine and the folding machine are combined to process the book binding process.

Figure 19:
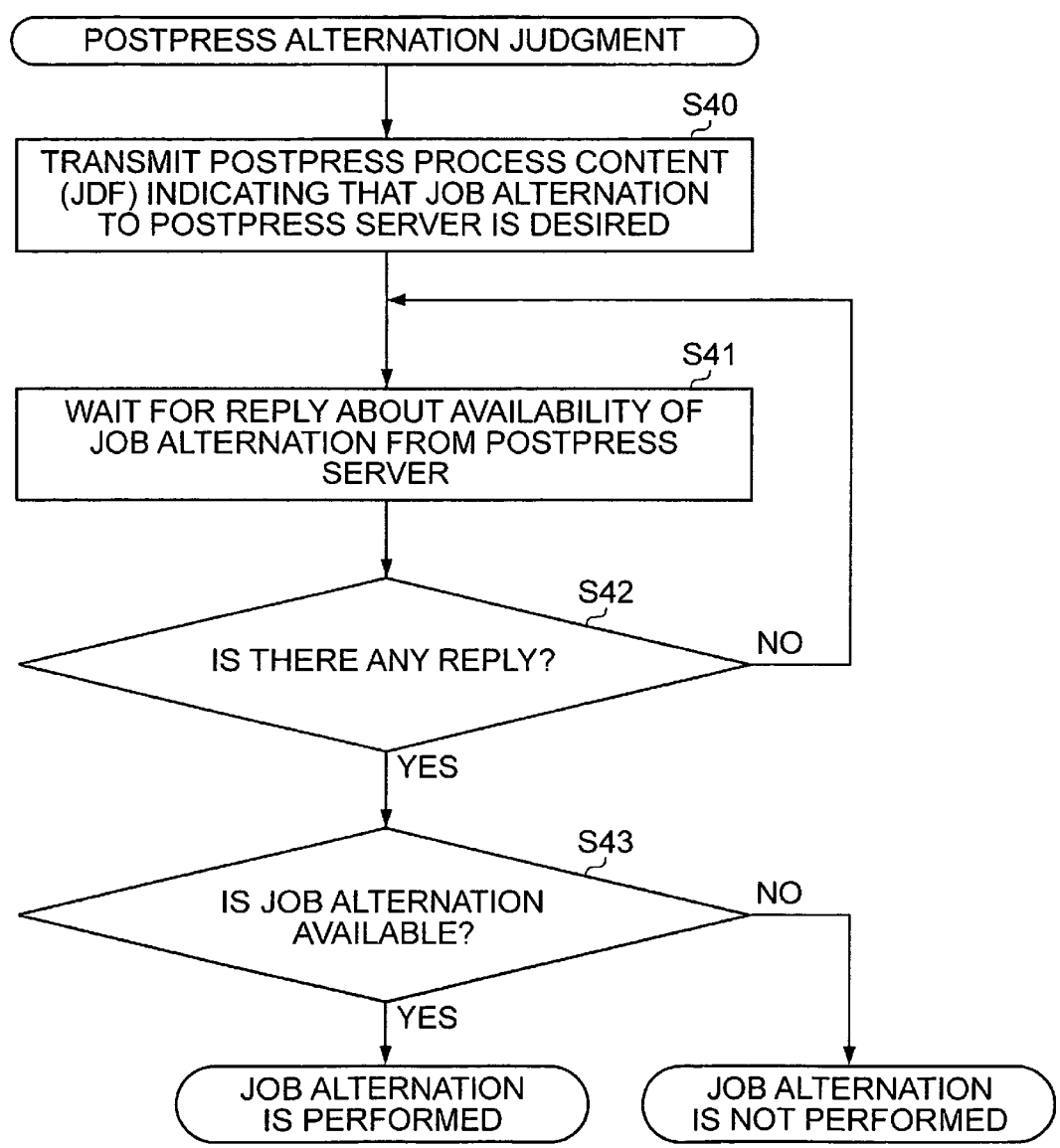
FIG. 19 is a fourth flowchart for describing the process of the first embodiment.

FIG. 19 is a flowchart for describing a second example of a judgment process as to whether or not the finishing process in Step S9 of FIG. 16A can be deal with the nearline finisher in the job alternation. FIG. 19 shows a judgment method in which the EFM 92 inquires with the PostPress process server managed by the nearline finisher as to whether or not the PostPress process server managed by the nearline finisher can perform the job alternation. In this embodiment, the PostPress process server stores the list of all the devices (the nearline finishers) connected within the printing system. It should be noted that in this flowchart as well, the description has been given while assuming that the nearline finisher is set as the job alternation target but the construction is not limited to the above. Any external device may be used except the MFP managed by the EFM 92.

First, in Step S40, the EFM 92 creates (or changes) the JDF for the job alternation process in Step S1 of FIG. 16A on the basis of the JDF received from the MIS server. In detail, the print job control section 115 in the EFM 92 changes setting of the JDF for the job alternation. The EFM 92 transmits the JDF for the job alternation to the PostPress process server in the printing system. In this embodiment, only one PostPress process server 40 exists in the printing system.

Then in Step S41, the EFM 92 waits for a reply from the PostPress process server about the process availability. Then, it is judged whether or not there is a nearline finisher PostPress process server that is not currently executed, is not on a schedule for performing the job process, and has a function of executing the PostPress process described in the transferred JDF for the job alternation, among the nearline finishers managed by the PostPress process server. The information is returned to the EFM 92.

Then in Step S42, when there is still no reply, the EFM 92 returns the process to Step S41, and when there is a reply, the EFM 92 advances the process Step S43, to check whether or not the job alternation can be conducted.

It should be noted that other than the description given in FIGS. 18 and 19, by previously storing the nearline finisher function information (external device capacity information) in the memory section of the MFP, it may be judged whether or not the job alternation is available.

Furthermore, in this embodiment, the EFM 92 obtains the schedule information from the MIS server to judge about the process delay, but the construction is not limited to the above. The MIS server may judge about the process delay by inquiring with the MIS server to notify the EFM 92 of the judgment result.

In the first embodiment, the process of changing or creating the JDF to request the job alternation process when there is a delay or the like in the schedule has been described. However, this embodiment is not limited to the above-mentioned construction. It is conceivable that the EFM 92 instructs the MFP 37 to change the work process steps to be processed on the basis of the process condition of the MFP 37 currently processing the print job. According to this specification, the MFP 37 is commanded to execute the preprint process (the PrePress process), the print process (the Press process), the print post-treatment (the PostPress process or the finishing process). However, depending on the process condition (for example, in the case where a delay is caused in the schedule of the MFP 37 managed by the MIS server or where the finishing process that should be executed by the MFP 37 cannot be executed), the EFM 92 instructs the MFP control section 100 to change the work process steps that should be processed. For example, the EFM 92 requests an external device (for example, a nearline finisher) that can execute the PostPress process to alternately perform the PostPress process that should be executed by the MFP 37. As a result, the work process steps that should be processed by the MFP 37 are changed from the three work process steps including the PrePress process, the Press process, and the PostPress process to the two the work process steps including the PrePress process and the Press process, making it possible to prevent the schedule delay.

Second Embodiment

In the first embodiment, the description has been given of the process of causing the external device (for example, the nearline finisher) to alternately perform the PostPress process, whereby the print job process in the MFP 37 is finished early and the next print job process is started early.

Hereinafter, as a second embodiment, a description will be given of a process of using the MFP in the printing system, whereby the print job and the next print job is started early.

Figure 20:
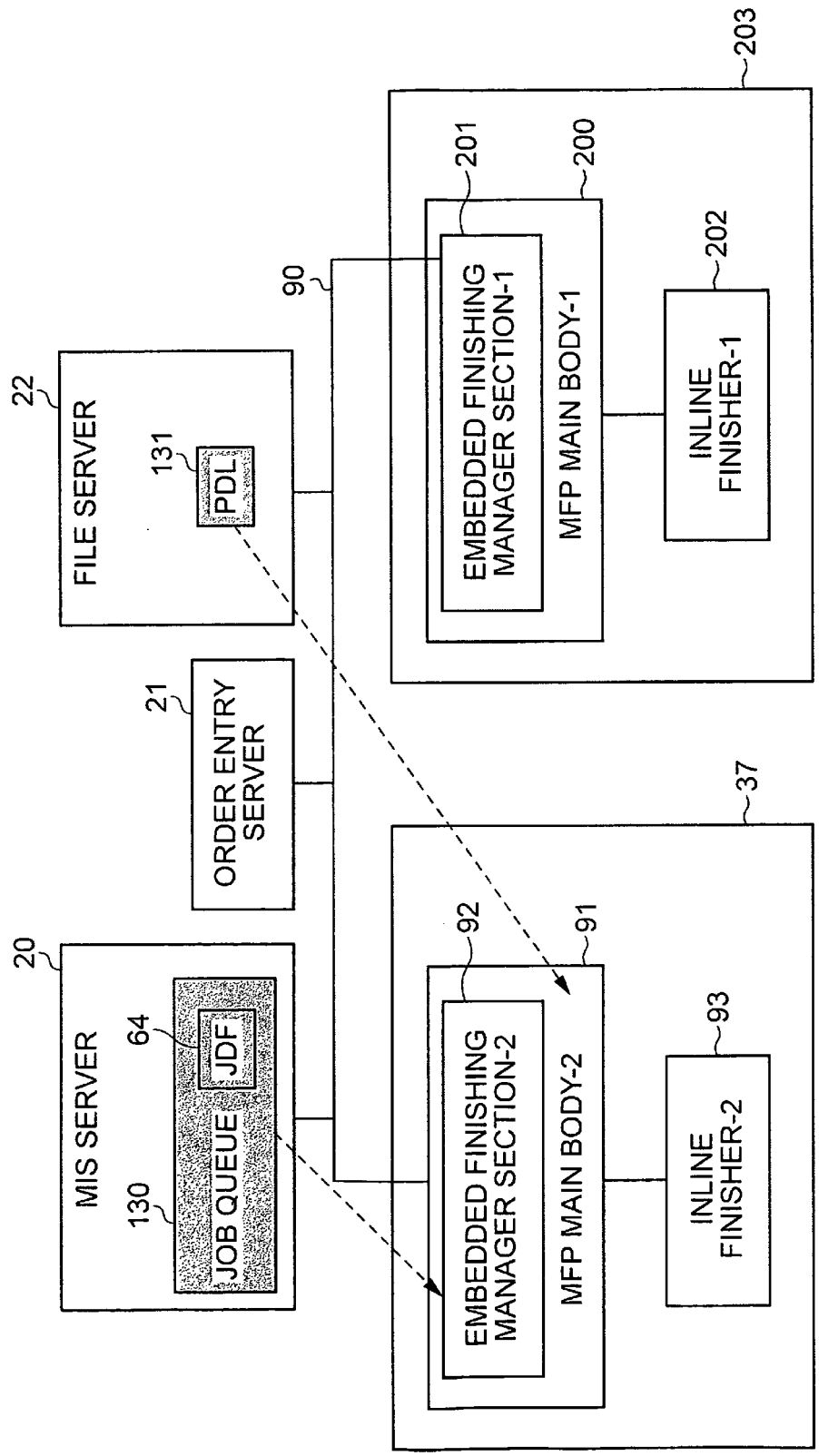
FIG. 20 is a diagram for describing starting of a print job according to a second embodiment of the present invention.

FIG. 20 is a diagram for describing a process in which the digital print section firstly receives the print job from the process flow management section according to the second embodiment. In the second embodiment, such a construction is adopted that there are two MFPs (the MFP 37 and the MFP 203) in the printing system. Also, in the second embodiment, the repeated description for the same item and process as those in the first embodiment will be not particularly made. Therefore, unless particularly described, the description of the first embodiment holds the same. It should be noted that the functions of the MFP 37 and the MFP 203 described in the second embodiment include inline finisher and the EFM similarly to the MFP described in the first embodiment.

In the second embodiment as well, in accordance with the process schedule, the JDF 64 is firstly transmitted from the MIS server 20 to the EFM 92, and after the EFM 92 analyzes the instruction in the JDF 64, the print content data (for example, the PDL) 131 is received from the file server.

Figure 21:
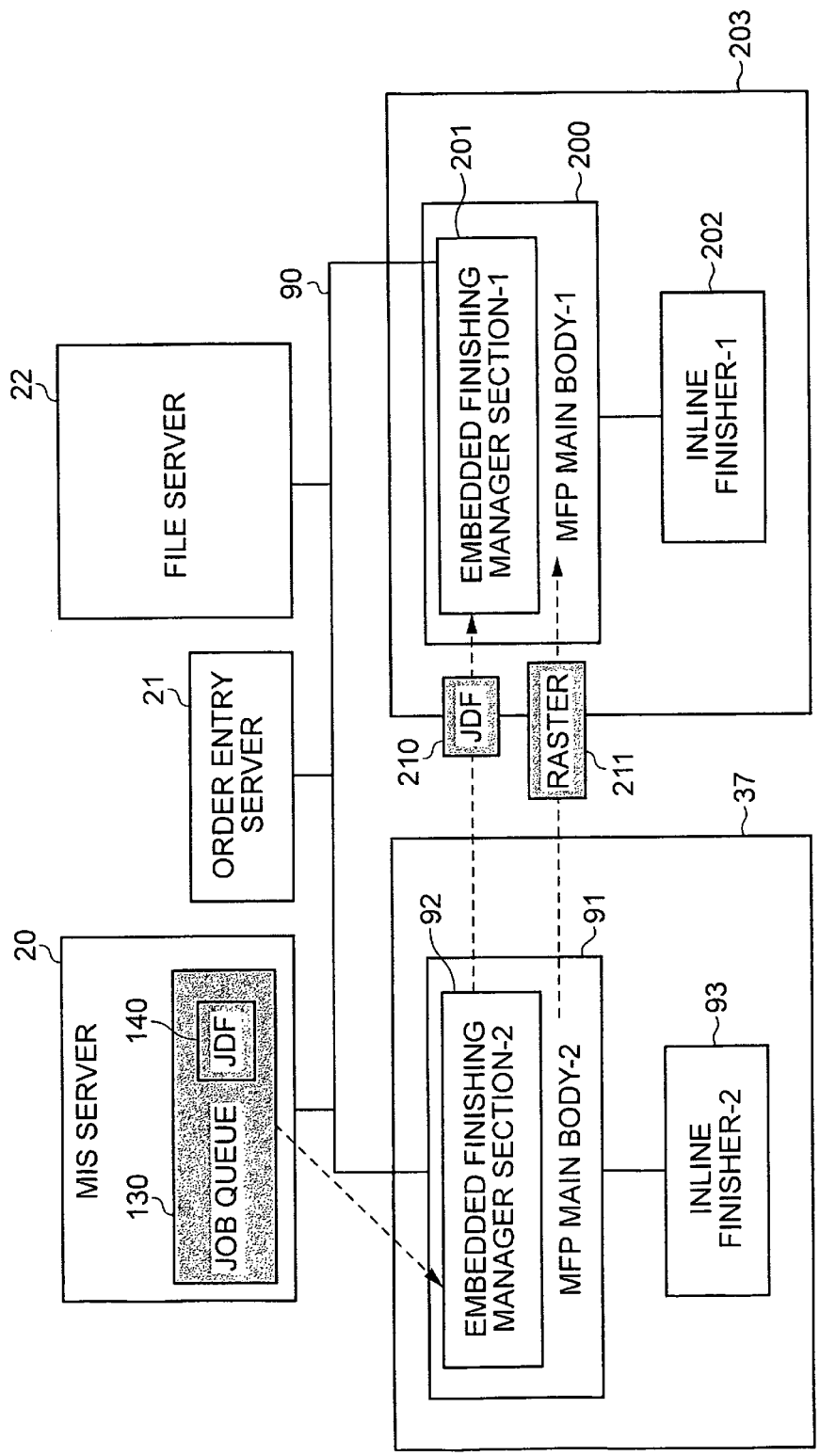
FIG. 21 is a diagram for describing a print job dispersion process according to the second embodiment.

FIG. 21 is a diagram for describing a process in which a job dispersion request of the Press process and the PostPress process in the print job process according to the second embodiment is made from the MFP 37 to the MFP 203.

A JDF 210 shown in FIG. 21 is the JDF for the job dispersion process transmitted from the EFM 92 to an EFM 201. In the second embodiment, only the PrePress process has been executed by the MFP 37, and a job dispersion request of the Press process and the PostPress process is made to the MFP 203. The detail of the JDF 210 will be described with reference to FIG. 22. In addition, in the second embodiment, as the process up to the PrePress process has been executed, such a construction is adopted that raster data 211 having been subjected to the PrePress process is transmitted along with the JDF 210 from the MFP 37 to the MFP 203. While using the raster data 211, the MFP 203 executes the Press process.

Figure 22:
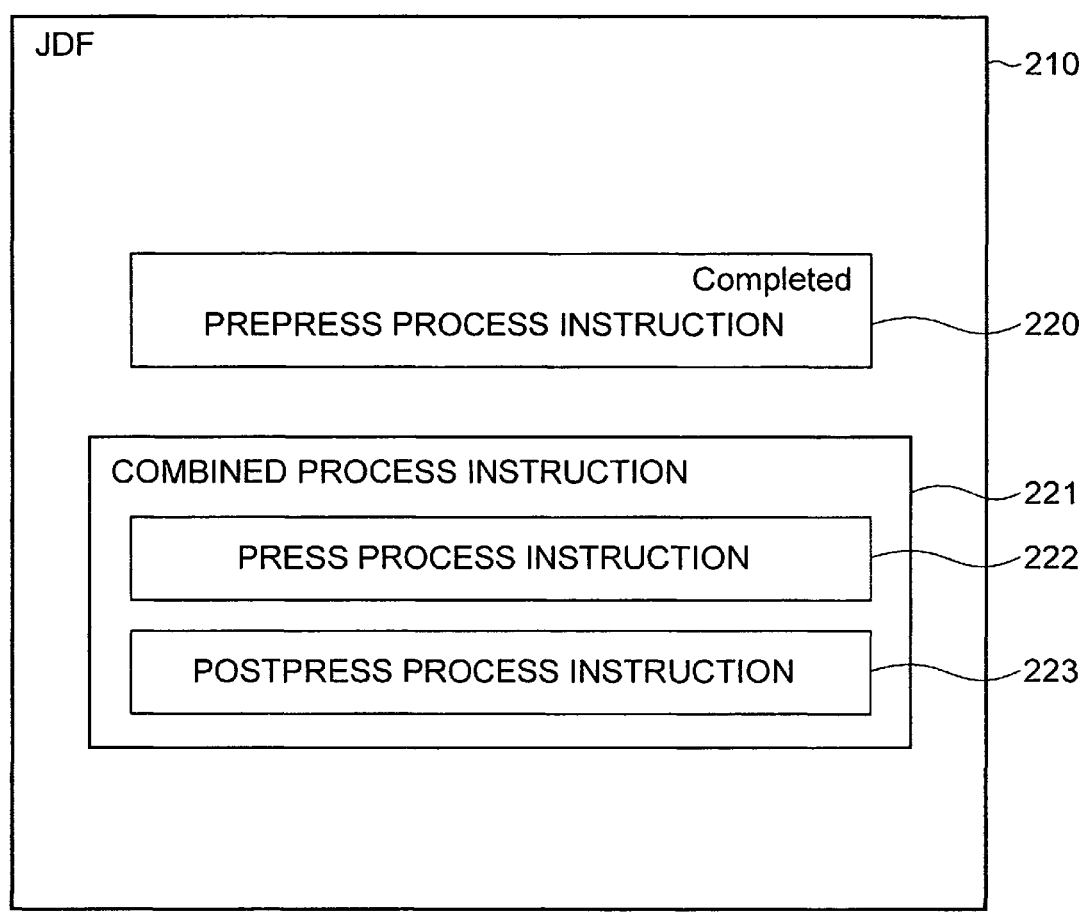
FIG. 22 is a diagram for describing a JDF at the time of requesting print job dispersion according to the second embodiment.

FIG. 22 is a diagram for describing the JDF 210 transmitted from the EFM 92 to the EFM 201 in FIG. 21. As described above, the second embodiment shows an example where the process up to the PrePress process has been executed by the MFP 37 and the Press process and the PostPress process are to be dispersed.

The JDF 210 is the description with which the EFM 92 requests the EFM 201 to execute the job dispersion process. The PrePress process instruction 220 is information indicating the instruction content of the PrePress process, and a mark "Completed" indicating the end of the process is added. The Press process based on the Press process instruction 222 and the PostPress process based on the PostPress process instruction 223 are described in the combined process instruction 221, and the MFP 203 executes a process based on the information on the combined process instruction 221 other than the PrePress process to which the mark "Completed" is added.

Figure 23:
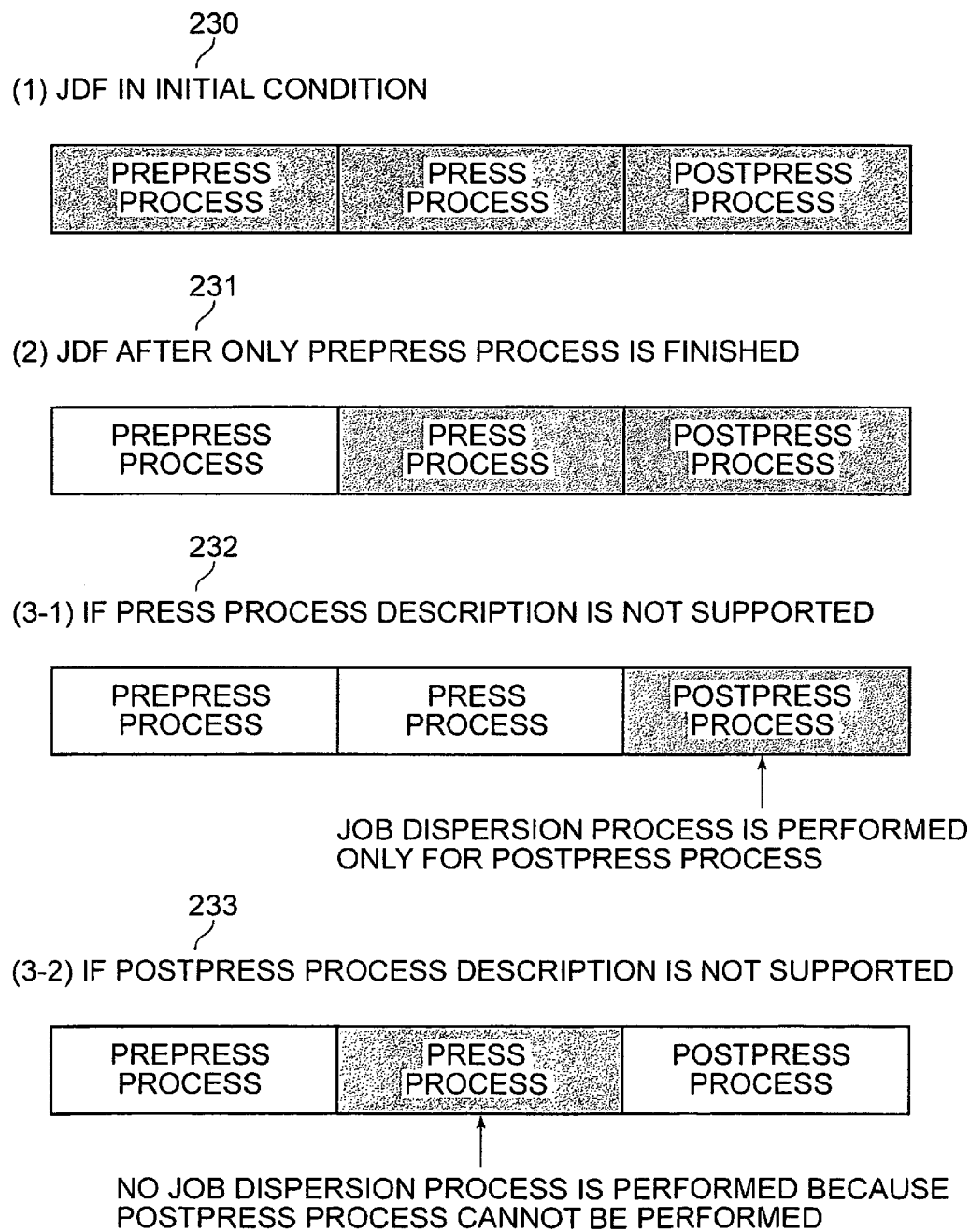
FIG. 23 is a diagram for describing a JDF version and judgment as to whether or not the job dispersion process can be performed according to the second embodiment.

FIG. 23 is a diagram for describing an embodiment mode of the job dispersion process. In order to judge whether or not the job dispersion process request will be made, the judgment uses the following two criteria. The first one is whether or not an external device belonging in the printing system has a function of executing the job dispersion process. The other one is whether or not the external device can understand the requested JDF description. The detail will be described with a flowchart of FIG. 29. Here, a job dispersion process notation system, a job dispersion availability judgment, and a job dispersion request method will be described.

The JDF 230 in the initial condition refers to the JDF immediately after being transmitted from the MIS server. A process in a gray background means that the process is still unprocessed. As the JDF 230 in the initial condition shows, a case will be described where the PrePress process, the Press process, and the PostPress process are instructed.

Denoted by reference numeral 231 is an example of the JDF where only the PrePress process has been finished. The background of the PrePress process is in white. At this point, when the job dispersion process for the print job is desired, the EFM 201 as the job dispersion target supports the version of the JDF described in the Press process and the PostPress process in the JDF 231 (in other words, when the EFM 201 can analyze the JDF 231), the job dispersion process for the Press process and the PostPress process can be requested. However, when the version of the JDF described in the Press process is not supported by the EFM 201, the job dispersion process only for the PostPress process is available. This corresponds to an example 232. In other words, in the JDF 232, the process up to the PrePress process is executed by the MFP 37, and a request of the job dispersion process for the Press process and the PostPress process is transmitted to the EFM 201. However, the described content of the Press process is not the version that can be analyzed by the EFM 201 as the job dispersion target (that is, unsupportable version), and the process requested for the job dispersion is limited to the PostPress process step. Therefore, in the JDF 232 to which the request is transmitted, the PrePress process and the Press process are displayed in white. This means that these processes have been executed. Meanwhile, the PostPress process is displayed in gray. This means that the process is not executed. The PostPress process is the job dispersion target by the MFP 203.

When the version of the description method for the JDF described in the PostPress process is not supported by the EFM 201, the MFP 203 cannot process the job to the end, and the EFM 92 judges that the job dispersion cannot be made. This corresponds to an example 233. To elaborate, even when only the Press process can be executed by the MFP 203, the PostPress process that should be executed thereafter cannot by executed by the MFP 203. For this reason, even if the job dispersion process for only the Press process is requested to the MFP 203, the PostPress process needs to be executed by the MFP 37 eventually, and thus a wasteful process is caused. Accordingly, the EFM 92 judges that the job dispersion process cannot be performed.

Figure 24A:
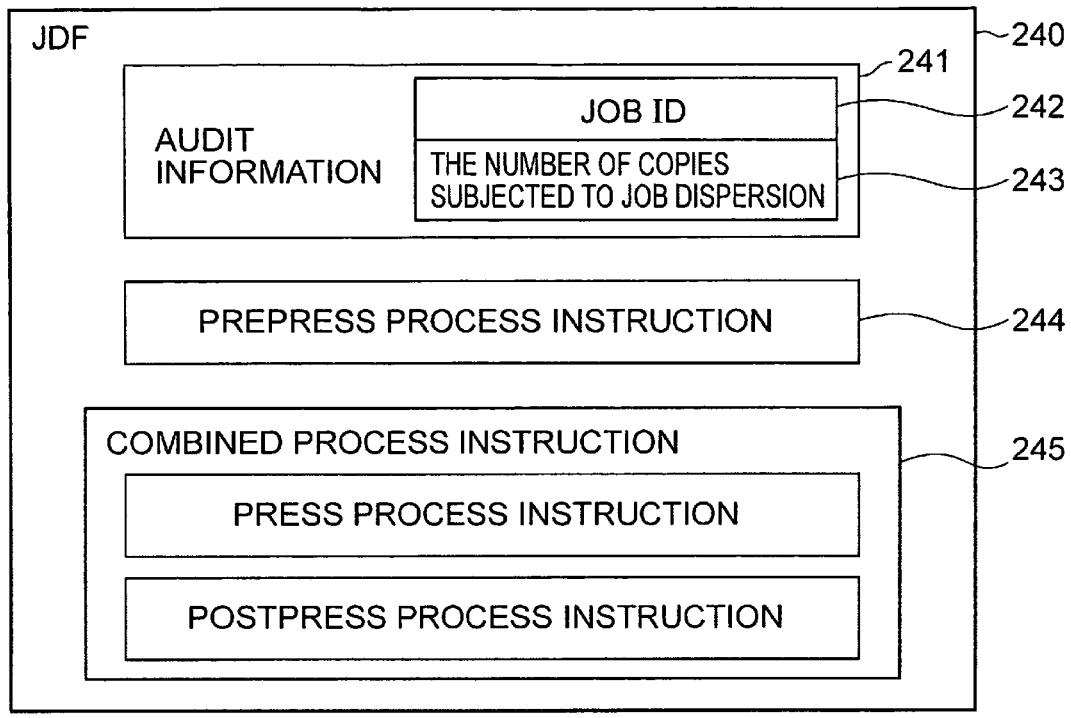
FIGS. 24A and 24B are diagrams for describing the JDF for notifying an MIS server of the job dispersion process according to the second embodiment.
Figure 24B:
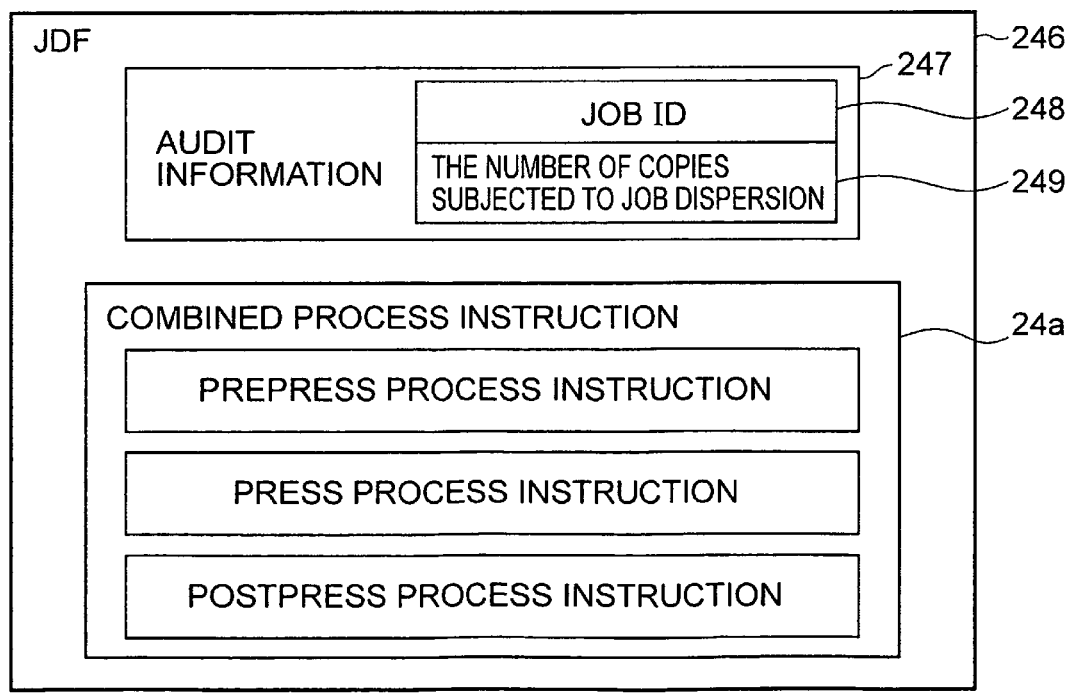

FIGS. 24A and 24B show an example of a JDF in which each EFM notifies the MIS server that the print job is subjected to the dispersed print process.

A JDF 240 shows an example where the MIS server is notified of the JDF from the EFM 201 to which the job dispersion process is requested. The JDF 240 is information indicating which process is executed by the MFP 203. Audit information 241 records various pieces of information about the print job. A job ID 242 is information for identifying the print job, and the number of job dispersion 243 shows the number of job dispersion copies to be executed by the MFP 203. The JDF 240 adopts a JDF construction indicating that the MFP 203 does not execute the PrePress process 244 but executes the Press process and the PostPress process.

A JDF 246 is a JDF for showing the content to be processed by the MFP 37, and a job ID 248 records the same information as that of the job ID 242. Thus, it can be identified by the MIS server that the JDF 240 and the JDF 246 are the JDFs for the same print job. The number of job dispersion copies 249 shows the number of all copies to be processed by the MFP 37. When the total number of the number of job dispersion 243 and the number of job dispersion copies 249 is not coincident with the number of all the copies that should be processed, which is described in the JDF before the job dispersion process, the MIS server can judge that there are other job dispersion targets. Then, the JDF 246 indicates that the PrePress process, the Press process, and the PostPress process are described in the combined process, and the three processes are executed in the MFP 37. It should be noted that as the job dispersion process is requested to the MFP 203, the number of copies that should be processed by the MFP 37 is reduced.

Figure 25:
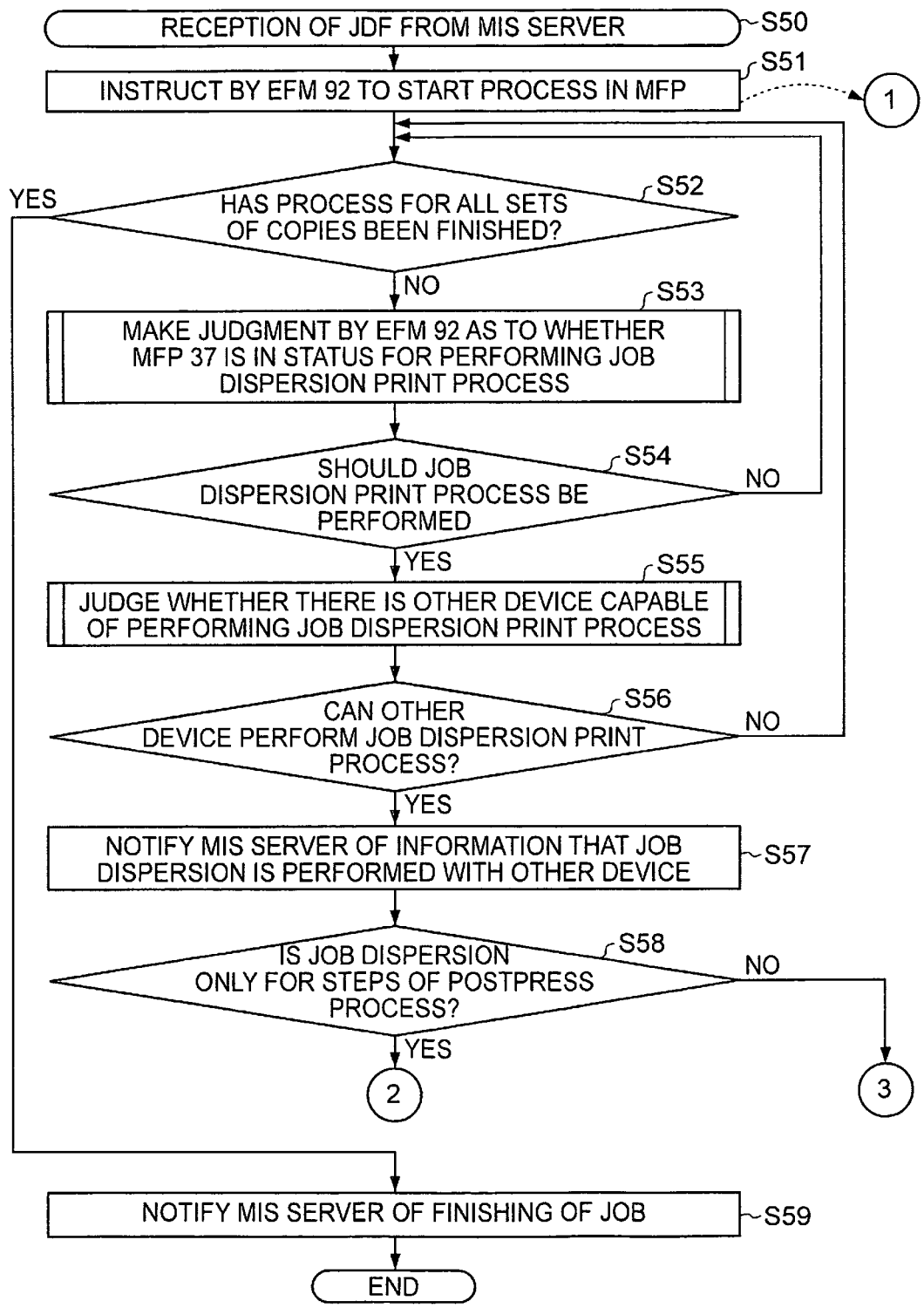
FIG. 25 is a first flowchart for describing a process of the second embodiment.

FIG. 25 is a flowchart for describing a process of the EFM 92 in which the print job in the second embodiment is subjected to the job dispersion process with an external device (for example, the MFP 203).

In Step S50, the EFM 92 receives the JDF from the MIS server. Then in Step S51, the EFM 92 instructs the MFP control section 100 to start the process of the print job in accordance with the instruction of the received JDF. In Step S52, the EFM 92 judges whether or not the process for all the copies has been finished. When the process has been finished, the flow proceeds to Step S59, and when the process has not been finished, the flow proceeds to Step S53. It should be noted that the process described in Steps S50 to Step S52 is the same as that described in Step S1 to Step S3 of FIG. 16A, so the detail of the process will be omitted.

In Step S53, the EFM 92 judges whether or not the MFP 37 should execute the job dispersion print process. It should be noted that regarding the judgment whether or not the job dispersion process should be performed, the EFM 92 communicates with the MIS server 20, for example, it is judged whether or not the schedule managed by the MIS server 20 involves the delay for the process that should be executed by the MFP 37, to judge the necessity of the job dispersion process. In other words, the above-mentioned process is similar to the process described in Step S4 of FIG. 16A.

On the basis of the judgment process in Step S53, when the EFM 92 judges that the job dispersion process is unnecessary (for example, when it is judged that the schedule managed by the MIS server 20 involves no delay), the flow returns to Step S52. When the EFM 92 judges that the job dispersion process is necessary (for example, when it is judged that the schedule managed by the MIS server 20 involves a delay), the process flow proceeds to Step S55. It should be noted that the detail of the process will be described with reference to FIG. 28.

In Step S55, the EFM 92 judges whether or not there is an external device capable of performing the job dispersion process. It should be noted that the process in Step S55 is almost the same as that in Step S9 of FIG. 16A and that described in FIG. 18, the detail of the process will be omitted. In this embodiment, the MFP is described as the job dispersion process target but, for example, the nearline finisher may be set as the job dispersion process target and only the finishing process is performed in a job dispersion manner. It should be noted that the detail of the process in Step S55 will be described with reference to FIG. 29.

Then in Step S56, the EFM 92 judges that there is a device capable of performing the job dispersion process in Step S55, the flow proceeds to Step S57. When the EFM 92 judges that there is no device capable of performing the job dispersion process, the flow returns to Step S52 and the job dispersion process is not performed.

In Step S57, the EFM 92 notifies the MIS server 20 that the job dispersion process is executed with an external device. At this time, FIGS. 24A and 24B show an example of a JDF that the MIS server is notified of. In detail, the print job control section 115 of the EFM 92 creates (or changes) the JDF 246 shown in FIG. 24B to notify the MIS server of the JDF.

Then, the flow proceeds to in Step S58, where the EFM 92 judges whether or not only the PostPress process is subjected to the job dispersion process. When only the PostPress process is subjected to the job dispersion process, the flow proceeds to Branch 2. The process in this case will be described with a flowchart of FIG. 26. On the other hand, the Press process step and the like other than the PostPress process step are also subjected to the job dispersion process, the flow proceeds to Branch 3. The process in this case will be described with a flowchart of FIG. 27.

In Step S59, the EFM 92 notifies the MIS server of the end of the print job.

With the use of the process described in FIG. 25, the EFM 92 grasps a process function of a device connected to the printing system. When a device capable of executing the job dispersion process is detected, the JDF for the job dispersion process is generated (or changed) to execute the job dispersion process, whereby the process speed can be increased while the setting described in the JDF are maintained. Furthermore, by using the EFM 92 of this embodiment, even when the job dispersion process is judged to be necessary during the process, the job dispersion process can be executed without stopping the process.

Figure 26:
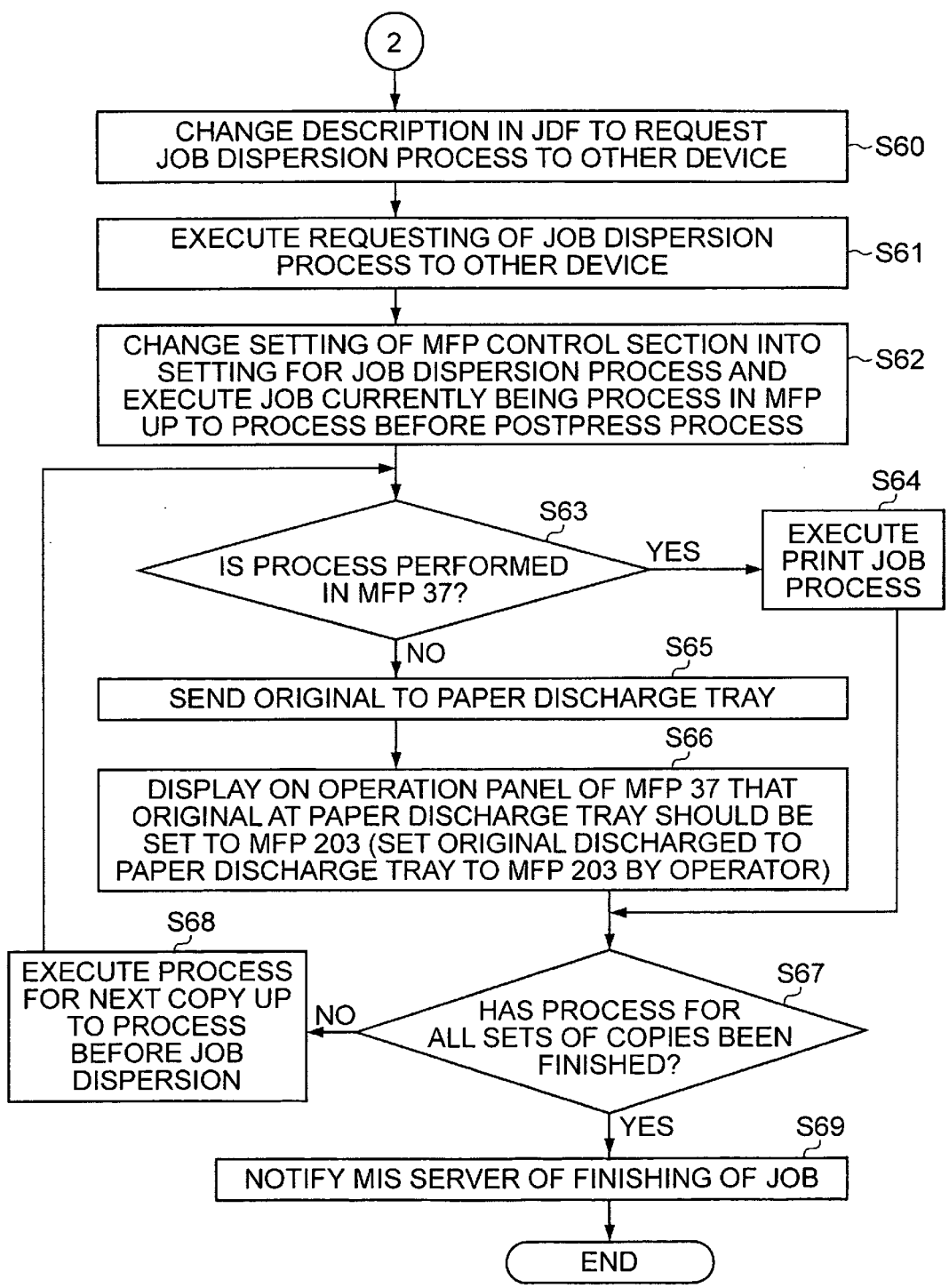
FIG. 26 is a second flowchart for describing the process of the second embodiment.

FIG. 26 is a flowchart used when only the PostPress process is subjected to the job dispersion process in FIG. 25. That is, as shown in the JDF 232 of FIG. 23, a process flow example is described in the case where the process up to the PrePress process has been finished in the MFP 37, for example, and the Press process and the PostPress process are desired to be subject to the job dispersion process, but the Press process cannot be performed in the job dispersion manner.

In Step S60, on the basis of the JDF received from the MIS server, the EFM 92 creates the JDF 210 for requesting the job dispersion process to the MFP 203. It should be noted that the creation process in Step S60 includes a change process on the JDF. In detail, the EFM 92 judges that only the PostPress process is subjected to the job dispersion process, the print job control section 115 of the EFM 92 changes the JDF 210 for requesting the job dispersion process for the PostPress process. Also, when the JDF is created, the EFM 92 recognizes the work process steps that should be dispersed, and newly creates a JDF for the job dispersion on the basis of the work process steps that should be dispersed.

Then in Step S61, the EFM 92 transmits the JDF created (or changed) in Step S60 to the EFM 201 possessed by an external device serving as the job dispersion process request target to request the job dispersion process for the print job. FIG. 21 shows an example of this case. In FIG. 26, only the PostPress process is subjected to the job dispersion process, and the transmission of the raster data 211 as shown in FIG. 21 is not performed.

Then in Step S62, the EFM 92 instructs the MFP control section 100 of the MFP 37 that the work process steps are changed for the job dispersion process. In other words, in FIG. 26, the MFP control section 100 is instructed to execute the process immediately before the PostPress process. To describe the process in Step S62, an example will be given below. The JDF received by the MFP control section 100 of the MFP 37 from the MIS server in Step S50 of FIG. 25 describes that the process from the PrePress process to the PostPress process is executed in the MFP 37 for ten copies. However, the job dispersion process is performed for the PostPress process, and the number of copies to be processed changes. Therefore, the EFM 92 instructs the MFP 37 to perform the process for the number of copies obtained by subtracting the number of copies whose PostPress process is requested for the job dispersion from the ten copies. In accordance with the change instruction of the work process steps from the EFM 92, the MFP control section 100 handles the job to be processed by the MFP 37 through alternate execution of the process up to the PostPress process and the process up to the Press process. The EFM 92 requests the MFP 203 to execute the PostPress process of the print job whose process up to the Press process has been executed. After that, the MFP control section 100 of the MFP 37 analyzes the work process steps changed by the EFM 92 as described above, and the process in accordance with the instruction content (the process immediately before the PostPress process for every copy in this embodiment) is executed.

Then in Step S63, the MFP control section 100 judges whether the process up to the PostPress process or the process up to the Press process is performed by the MFP 37 in the print job to be processed. It should be noted that in the second embodiment, as described above, the process of switching for every copy is adopted, so such an instruction is issued that the process up to the Press process is performed for the odd numbered copies and the process up to the PostPress process is performed for the even numbered copies as counted from the job dispersion process start. As a result, it is possible to disperse the process burden generated from the print post-treatment. It should be noted that with the judgment in Step S63, the work process steps changed in Step S62 are managed by the job management section in the MFP control section 100, and the content is stored in the memory section 10*b*. By referring to the work process steps for the job dispersion stored in the MFP control section 100, it is possible to switch the execution of the process up to the PostPress process and the execution of the process up to the Press process. It should be noted that which page is currently processed can be recognized through counting the pages up by the MFP control section 100 every time the print original is output.

In Step S63, the MFP control section 100 judges that the process up to the PostPress process is performed by the MFP 37, the flow proceeds to Step S64, and the print job is processed up to the PostPress process. When the MFP control section 100 judges that the process up to the PostPress process is not performed by the MFP 37, the flow proceeds to Step S65.

In Step S65, the MFP control section 100 issues an instruction to set the print original to the paper discharge tray.

Then the flow proceeds to Step S66, where the MFP control section 100 displays on the operation panel of the MFP 37 that the original in the paper discharge tray is set to the MFP 203 designated as the job dispersion process target. In detail, information set as the job dispersion process target (the MFP 203 is set as the job dispersion process target in this embodiment) is stored in the memory section 10*b*. Therefore, when the MFP control section 100 refers to the memory section 10*b*, the job dispersion process target that should be displayed on the operation panel of the MFP 37 can be determined. Here, in accordance with the instruction displayed on the operation section, the operator sets the print original discharged to the paper discharge tray of the MFP 37 to the MFP 203, whereby the PostPress process that should be executed in the MFP 37 is executed by using the inline finisher of the MFP 203. It should be noted that as the MFP 203 carries over the JDF including the instruction content that should have been executed by the MFP 37, it is possible to execute the print post-treatment while reflecting the order content from the client.

Then the flow proceeds to Step S67, where the EFM 92 judges whether or not the process for all the copies has been finished. When the process has been finished, the flow proceeds to Step S69 to notify the MIS server of the end of the job. When the process for all the copies has not been finished, the flow proceeds to Step S68, where the process for the next copy is executed.

Figure 27:
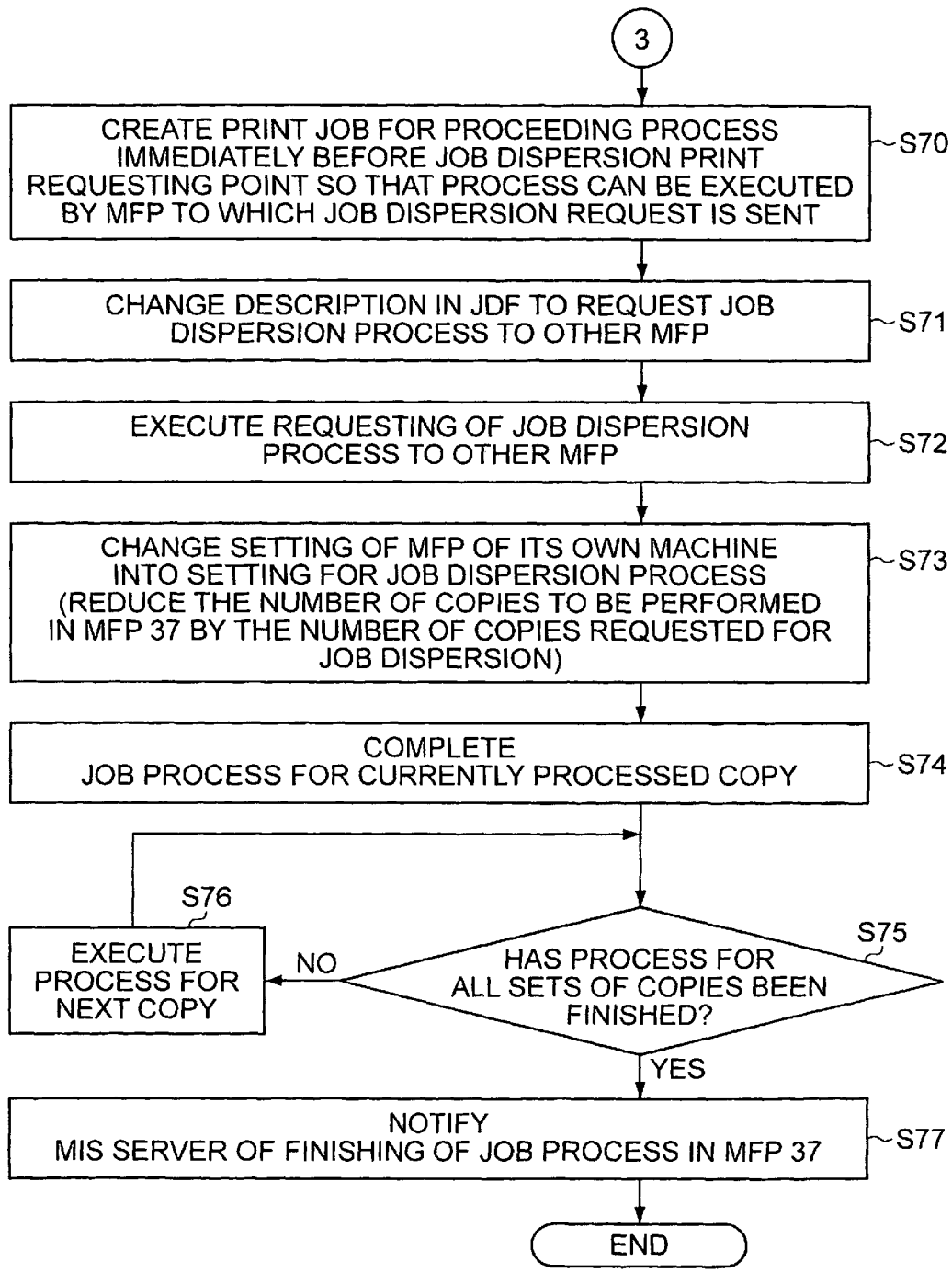
FIG. 27 is a third flowchart for describing the process of the second embodiment.

FIG. 27 shows a flowchart in the case when the process other than the PostPress process is also included for the job dispersion process in FIG. 25. In other words, as shown in the example 231 of FIG. 23, a process flow example will be described where the process of the print job is finished until the PrePress process in the MFP 37 and the Press process and the PostPress process are subjected to the job dispersion process. It should be noted that to give a detail description in the flowchart, the job dispersion request sender is set as the MFP 37 and the job dispersion target is set as the MFP 203, but the construction is not limited to the above.

First of all, in Step S70, the EFM 92 judges as the MFP 203 the job dispersion target on the basis of the process in Steps S55 and S56 of FIG. 25 described above. Therefore, the EFM 92 instructs the MFP control section 100 of the MFP 37 to advance up to the process immediately before the dispersed print request for the MFP 203 to which the job dispersion target is requested to execute the subsequent process. In the second embodiment, the MFP 37 executes the process up to the PrePress process, and the Press process and the PostPress process are subjected to the job dispersion process. Thus, the MFP 37 creates the raster data 211 having been subjected to the PrePress process from the PDL 131 that is print content data. As the PrePress process, for example, there are exemplifies a color conversion process and an imposition process. It should be noted that the raster data is used in the MFP 37 and the MFP 203 as well, so after being rasterized, the raster data is stored in the memory section 10*b* of the MFP 37 and copy data of the raster data is transmitted to the MFP 203.

Then in Step S71, the EFM 92 creates the JDF for the job dispersion process in order that the MFP 203 is requested for the job dispersion. In Step S72, the JDF created in Step S71 is transferred to the EFM 201 of the MFP 203. It should be noted that in Step S72, the description has been given in which the JDF is created for the job dispersion process, but the process of changing the JDF for the job dispersion process may also be included. It should be noted that this process is almost the same as that described in Step S60, so the detail of the process will be omitted. Furthermore, an example of the JDF for the job dispersion process transferred in Step S71 corresponds to the JDF 210 of FIG. 22. That is, as described in the JDF 210, the PrePress process instruction is "Complete", and a JDF including the Press process instruction and the PostPress process instruction in the combined process instruction is created and transmitted to the EFM 201. Then, when the EFM 201 analyzes the JDF 210, the MFP control section of the MFP 203 are instructed to execute the Press process and the PostPress process by using the raster data 211 received from the MFP 37. It should be noted that in Step S72, the description has been given in which the EFM 92 changes the JDF received from the MIS server to request the job dispersion process but the construction is not limited to the above. The EFM 92 may recognize the work process steps that should be dispersed to newly create a JDF on the basis of the work process steps that should be dispersed.

In Step S73, the EFM 92 changes the setting of the MFP 37 of the EFM itself for the job dispersion process to be performed with the MFP 203. For example, when the process performance of the MFP 37 is the same as that of the MFP 203, the MFP 203 is requested to perform half the process for the rest of copies. The number of copies to be processed in the MFP 37 is reduced by the number of copies subjected to the job dispersion process. It should be noted that as the process performance of the job dispersion target is stored in the MIS server, when the EFM 92 communicates with the MIS server, the process performance can be obtained. The job dispersion ratio may be determined automatically on the basis of the process performance with respect to the thus obtained performance of the external device serving as the job dispersion target. It is needless to say that the user may determine the job dispersion ratio.

In Step S74, when the MFP control section 100 judges that there is a copy currently in the Press process or the PostPress process, the job process for this copy will be completed to the end. In detail, a communication section of the MFP control section 100 grasps the process status in the MFP 37, thereby making it possible to judge whether or not there is a print job currently being processed.

Then in Step S75, the MFP control section 100 judges whether or not the process for the copies that should be processed in the MFP 37 after the job dispersion request. When the process has not been finished, the flow proceeds to Step S76 to perform the process of the next xx-th copy. After that, When the process for all the copies has been finished, the flow proceeds to Step S77. It should be noted that when the MFP control section 100 judges that the process for all the copies has been finished, the MFP control section 100 notifies the EFM 92 of the ending of the process.

In Step S77, after the EFM 92 confirms the notification of the process ending received from the MFP control section 100, the EFM 92 notifies the MIS server 20, which is the print request source, of the ending of the print job process in the MFP 37.

It should be noted that the MIS server 20 having received the notification of the ending judges whether or not there is a JDF that should be processed next. When it is judged that the JDF that should be processed exists, the MIS server transmits the JDF to the EFM 92 to execute the next process.

By using the processes shown in FIGS. 26 and 27, without stopping the process in the MFP, it is possible to dynamically change the request content for change the job dispersion process according to the process performance of the job dispersion target (whether the MFP of the job dispersion target executes only the PostPress process or executes the Press process and the PostPress process).

Figure 28:
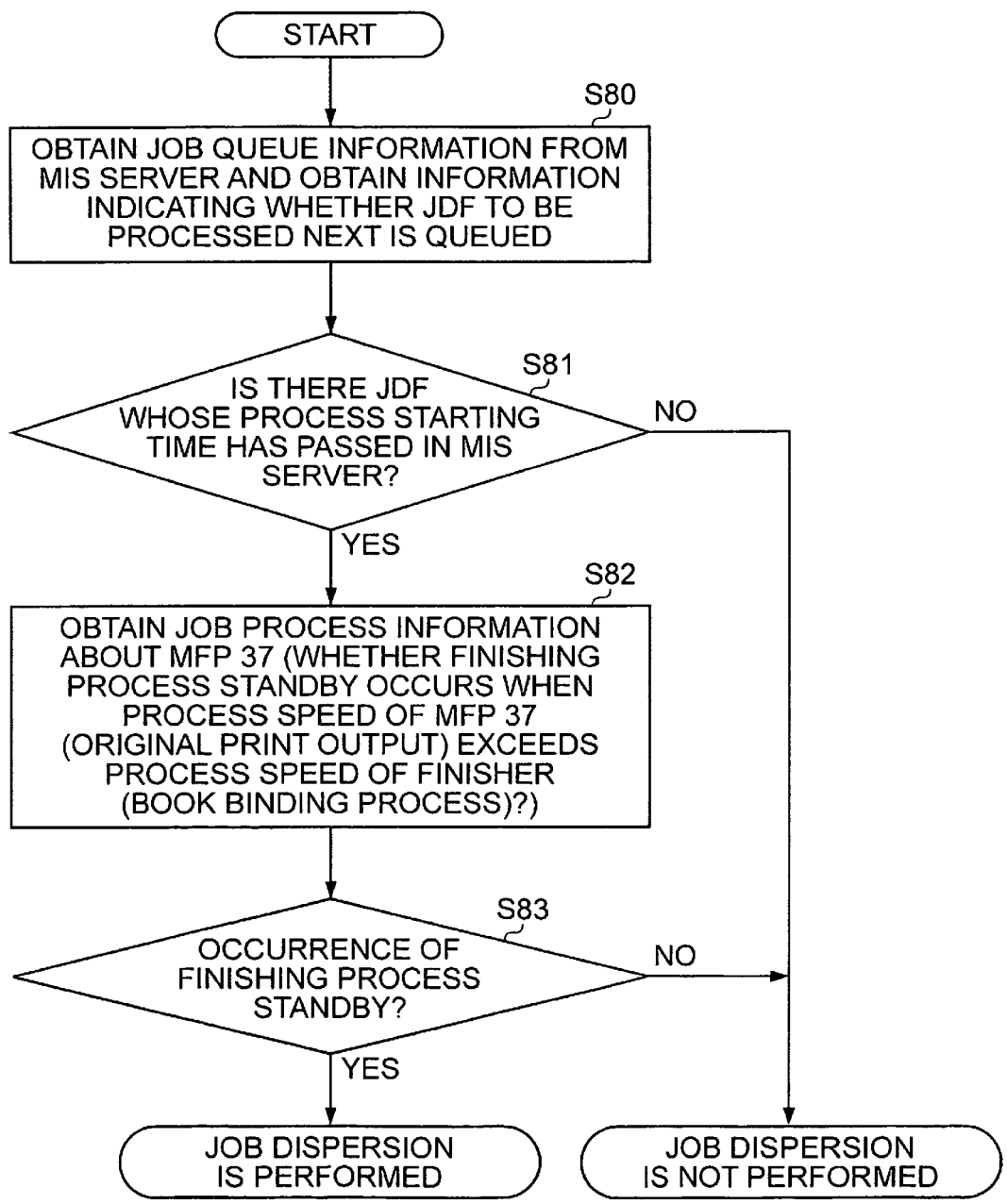
FIG. 28 is a fourth flowchart for describing the process of the second embodiment.

FIG. 28 shows a process flow for judging whether or not the EFM 92 applies the job dispersion process to the currently processed print job in the MFP 37 in Step S53 in the flowchart of FIG. 25.

First of all, in Step S80, the EFM 92 obtains job queue information from the MIS server. In Step S81, the EFM 92 judges whether or not there is a JDF whose process is not started even after the scheduled print job starting time in the condition where the JDF expected to be processed next in the MFP 37 is already queued in the job queue. In detail, the memory section of the MIS server stores the information on the schedule of the JDF that should be processed. When the EFM control section 112 analyzes the schedule information received via the NIC section 116 and status transmission and reception section 111 of the EFM 92, the EFM 92 can conduct the judgment process in Step S81.

Then in Step S81, when the EFM 92 judges that the JDF whose process starting time has passed exists in the MIS server, the flow proceeds to Step S82. When the EFM 92 judges that no JDF whose process starting time has passed exists, the job dispersion process is unnecessary and it is judged in Step S54 of FIG. 25 that the job dispersion process needs not to be executed.

Next, in Step S82, the EFM 92 obtains the job process information on the MFP 37 to judge whether or not a finishing process standby occurs. As an example of the judgment process in Step S82, the MFP control section 100 checks whether or not the finishing treatment standby occurs when the process speed of the main body of MFP 37 (the process time from when the print original is printed and output for one copy to when the print original is conveyed to the finisher) exceeds the process speed of the finisher (the time for performing the post-treatment on the print original), the finishing process. It should be noted that the EFM 92 can obtain information on the process condition in the MFP 37 via the communication section 121 in the MFP control section 100. Then, the process of Step S82 is realized when the EFM 92 is notified of the information obtained by the MFP control section 100 (the information indicating that the process speed of the MFP main body exceeds the process speed of the finisher, and the finishing process standby occurs).

In accordance with the process of Step S82, in Step S83, when the EFM 92 judges that the finishing process standby occurs, the print job being processed in the MFP 37 should be subjected to the job dispersion process. In Step S83, when the EFM 92 judges that the finishing process standby does not occur, the job dispersion process is not performed. In FIG. 28, the execution of the job dispersion process depends on whether or not the finishing process standby occurs, but as described above with reference to FIG. 25, the occurrence of the schedule delay may be realized by communicating with the MIS server to thereby execute the job dispersion process. It should be noted that these constructions are merely examples for judging the execution of the job dispersion process, and the construction is not limited to the above.

Figure 29:
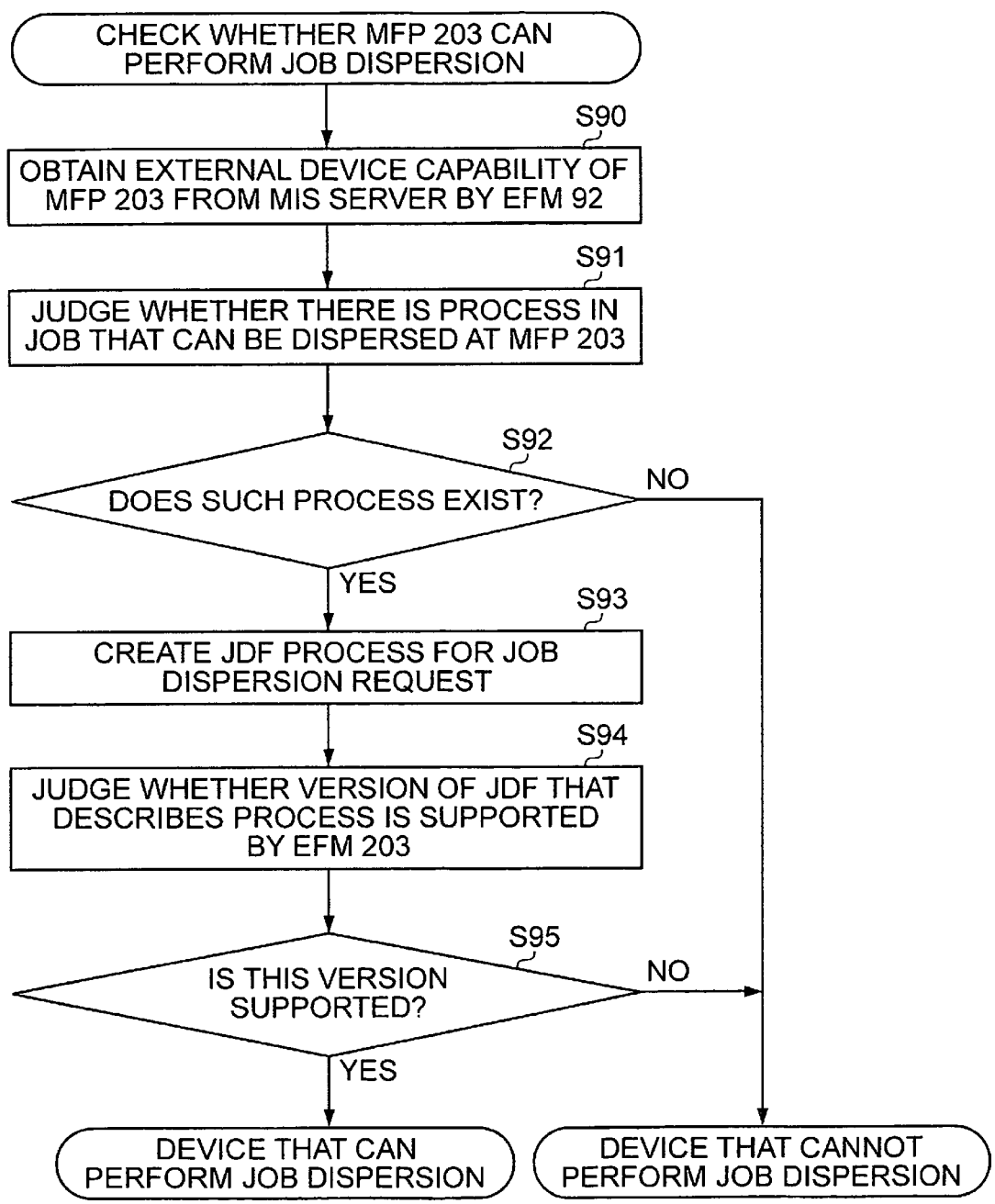
FIG. 29 is a fifth flowchart for describing the process of the second embodiment.

FIG. 29 shows a process flow in which the EFM 92 judges whether or not there is an external device capable of alternately performing the currently processed print job in Step S55 of the flowchart in FIG. 25. It should be noted that in this flowchart as well, the MFP is assumed as the job dispersion process target, but the construction is not limited to the above.

First of all, in Step S90, from the MIS server, the EFM 92 obtains external device capacity information indicating which process can be executed by other MFP in the printing system to which the MFP 37 belongs (which corresponds to the MFP 203 in this embodiment). In detail, the MIS server 20 stores on information on the devices belonging in the printing system (the external device capacity information), and therefore the EFM 92 communicates with the MIS server, making it possible to execute the process in Step S90.

Then in Step S91, the EFM 92 judges whether or not there are work process steps in the print job being processed in the MFP 37 that can be subjected to the job dispersion process with the MFP 203. In detail, the EFM 92 stores the content on the analysis from the JDF in the memory section 10b, the work process steps that should be executed in the print job being processed are grasped. Therefore, by comparing the external device capacity information obtained in Step S90 and the grasped work process steps with each other, the process in Step S91 can be executed. Now a description is given using a specific example. When the EFM 92 grasps information "staple process for each copy" as the PostPress process described in the JDF, if there is a device with an information description "staple process available" as the external device capacity information, it is judged that the work process steps that can be subjected to the job dispersion process.

Subsequently, in Step S92, according to the judgment result in Step S91, when the EFM 92 judges that there are no work process steps that can be subjected to the job dispersion process, it is judged that there are no devices to be the job dispersion target. On the other hand, when the EFM 92 judges that there are work process steps that can be subjected to the job dispersion process, the flow proceeds to Step S93.

Then in Step S93, the EFM 92 creates (or changes) the JDF for requesting the MFP 203 to execute the job dispersion process. The method is performed by selecting a step sequentially from the last step among the work process steps that are checked in Step S91 to be alternately performed in the MFP serving as the job dispersion process target. In detail, the EFM 92 grasps the work process steps in the currently processed print job. It is judged whether or not a step sequentially from the last step among the work process steps can be executed in the MFP serving as the job dispersion process target. For example, in this embodiment the last work process step executed the MFP 37 is the PostPress process. Therefore, the EFM 92 judges whether or not the PostPress process can be executed in the MFP 203. Here, the EFM 92 compares the external device capacity information on the MFP 203 obtained in Step S90 with necessary functions for the PostPress process in the currently processed print job. As a result, when the EFM 92 judges that the PostPress process can be executed by using the functions possessed by the MFP 203, it is judged that the PostPress process can be requested for the job dispersion and then stored in the memory section 10b temporarily. By continuing this judgment process with the Press process and the PrePress process, it is possible to continuously select the work process steps to be dispersed. For example, when it is judged that the PrePress process and the PostPress process correspond to the work process steps that can be subjected to the job dispersion process and the Press process corresponds to the job dispersion process that cannot be subjected to the job dispersion process, the process from the PostPress process to the PrePress process cannot be selected continuously, and only the PostPress process corresponds to the work process steps that can be subjected to the job dispersion process. Therefore, the EFM 92 creates (or changes) the JDF so that only the PostPress process is set as the work process steps to be requested for the job dispersion.

Then the flow proceeds to Step S94, where the EFM 92 checks whether or not the work process steps described in the JDF for the job dispersion process is supported within the JDF versions to be supported by the EFM 201. In other words, the EFM 92 communicates with the EFM 201 to obtain information on the executable version by the EFM 201, making it possible to execute the process in Step S94.

Then the flow proceeds to Step S95, on the basis of the check result in Step S94, when the EFM 92 judges that the version is within the supportable versions of the EFM 201 (in other words, when it is judged that the EFM 201 as the request destination can understand the instruction content of the work process steps described in the JDF for the job dispersion process), the MFP 203 judges that the device can perform the job dispersion process. On the other hand, when the EFM 92 judges that the version of the instruction content of the JDF to be requested is not supported by the EFM 201, the MFP 203 is judged to be a device incapable of dealing with the job dispersion.

In this specification, the process of changing or creating the JDF has been described to request the job alternation/dispersion process on a predetermined condition. However, this embodiment is not limited to the above. It is also conceivable that according to the process condition of the MFP 37 currently processing the print job, the EFM 92 instructs the MFP 37 to change the work process steps that should be processed. In this specification, the MFP 37 is commanded to execute the preprint process (the PrePress process), the print process (the Press process), and print post-treatment (the PostPress process or the finishing process). However, the EFM 92 instructs the MFP control section 100 to change the work process steps that should be processed according to the process condition. A description is given with a specific example. To apply the job dispersion on the Press process and the PostPress process that should be executed by the MFP 37, the EFM 92 issues the job dispersion request to an external device (for example, the MFP 203) that can perform the Press process and the PostPress process. As a result, the work process steps that should be processed in the MFP 37 are changed to the steps to be subjected to the job dispersion process.

In this specification, the MFP and the EFM are constructed to respectively have the NIC section, but may be constructed to share the NIC section. Also in this specification, the three kinds of processes, namely, the PrePress process, the Press process, and the PostPress process, are recorded in the JDF, but other kinds of the work process steps may be recorded. Furthermore, in the PrePress process, the plural work process steps such as the color conversion process and the imposition process may be recoded as the internal processes, and it is needless to say that the same holds true for the other processes.

In addition, in this specification, the EFM and the PostPress process server perform the process to judge on the job alternation availability, but such a construction may be adopted that the MIS server judges on the job alternation availability.

Furthermore, obtaining of information on the capacity of the external device such as the nearline finisher in Step S30 of FIG. 18 may be managed by the EFM through transmission of the information from the MIS server to the EFM at the time of booting the printing system. According to the present invention, by using one or plural external devices connected to the network, it is possible to reduce the operational burden through the job dispersion or job alternation even during the process, thereby improving the work efficiency of the entire system.

FIG. 30 is a diagram for describing a function that can be executed by the EFM according to the present invention. A reception section 3001 receives the job ticket and drawing data including work process steps. The reception section 3001 also receives the print process information including drawing data and the work process steps that should be processed.

A first judgment section 3002 judges whether or not on the basis of the process condition in the image processing apparatus, the work process steps to be processed are changed in the image processing apparatus. The first judgment section 3002 also judges whether or not on the basis of the process condition of the received drawing data, the work process steps to be processed are changed in the image processing apparatus.

When the first judgment section judges that the work process steps in the image processing apparatus are changed, a second judgment section 3003 judges whether or not there is an external device different from the image processing apparatus and capable of performing at least one of the work process step among the work process steps that should be processed in the image processing apparatus. When the first judgment section judges that the work process steps in the image processing apparatus are changed, the second judgment section 3003 also judges whether or not there is an external device capable of performing at least one of the work process step among the work process steps specified by the information received by the reception section.

When the second judgment section judges that the external device exists capable of performing at least one of the work process step among the work process steps that should be processed in the image processing apparatus, a creation section 3004 creates a job ticket for causing the external device to perform the work process steps that can be performed by the external device.

A transmission section 3005 transmits the job ticket created by the creation section.

A discharge section 3006 discharges a print original on which drawing data is printed through the process based on the job ticket.

When the external device exists capable of performing at least one of the work process step among the work process steps that should be processed in the image processing apparatus, a change section 3007 changes the work process steps to be performed by the image processing apparatus so that the external device is caused to perform the work process steps that can be performed by external device.

According to the present invention, the image processing apparatus can obtain the print process condition and the information about the external device connected to the network (for example, the nearline finisher, other MFPs, and the like). Thus, even after the print process is started, on the basis of those pieces of the information, the image processing apparatus can judge whether or not it is necessary to cause other devices to alternately perform the work process steps that should be processed in the image processing apparatus such as the finishing process for increasing the work efficiency and can judge whether or not the work efficiency can be increased, thereby making it possible to improve the work efficiency.

Also, according to the present invention, with respect to the print job in which the print is already conducted on the original in the image processing apparatus, the conveyance destination of the original can be changed to the paper discharge tray, and thus the job alternation process can be started from the print job being processed, thereby making it possible to further improve the work efficiency.

In addition, according to the present invention, when the job dispersion or the job alternation process is started at an arbitrary timing from the image processing apparatus to the external device connected to the network (for example, the nearline finisher or other MFPs), the operational mistakes in the work by the operator can be suppressed by displaying that the job alternation/dispersion process is performed, displaying the name of the device as the job alternation/dispersion process target, displaying that the preparation for performing the job alternation/dispersion process is ready, and displaying the procedure for the job alternation/dispersion process.

Moreover, according to the present invention, when any error or failure occurs in a print post-treatment device (inline finisher) mounted in the image processing apparatus to which the print request is issued, by causing one or plural print post-treatment devices (nearline finishers) connected to the network to alternately accept the finishing operational burden, the print job can be continued without stopping the process due to the error, thereby making it possible to further improve the work efficiency.

It should be noted that the present invention may also be achieved by supplying a memory medium (or a recording medium) for storing a software program code for realizing the function described in the above embodiments to a system or a device, and a computer (alternatively, a CPU or an MPU) in the system or the device reads out and executes the program code stored in the memory medium.

In this case, the function described in the above embodiments is realized by the program code itself read out from the memory medium, and the memory medium for storing the program code constitutes the present invention. Furthermore, the function described in the above embodiments may be realized by executing the program code, and also where the functions described in the above embodiments are realized by executing all or a part of the actual process by an operating system (OS) running on a computer on the basis of the instruction of the program code.

Furthermore, the following case is also applicable where the program code read out from the memory medium is written in a function expansion card inserted to the computer or a memory medium provided to a function expansion unit that is connected to the computer, on the basis of the instruction of the program code, and thereafter a CPU or the like provided to the function expansion card or the function expansion unit executes all or a part of the actual process, and the function described in the above embodiments is realized by the process.

Moreover, the present invention is also achieved when the software program code for realizing the function described in the above embodiments is distributed via a network to be stored in a storage unit such as a hard disk drive or a memory of the system or the device or in a memory medium such as a CD-RW or a CD-R, the computer of the system or the device (alternatively, the CPU or the MPU) reads out and executes the program code stored in the memory unit or the memory medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-127899 filed Apr. 26, 2005, which is hereby incorporated by reference herein in its entirety.

What is claimed is:

1. An image processing apparatus having first and second discharge trays and a program code stored on a non-transitory computer-readable medium, comprising:
 a reception unit configured to receive setting information and drawing data;
 an output unit configured to output a part of a printed material based on the setting information and the drawing data to the first discharge tray, wherein a finishing process based on the setting information is applied to the part of the printed material;
 a first judgment unit configured to judge whether or not a process based on the setting information and the drawing data is delayed after the part of the printed material is outputted by the output unit;
 a second judgment unit configured to judge whether or not there is an external device capable of executing the finishing process that should be processed in the image processing apparatus when the first judgment unit judges that the process is delayed after the part of the printed material is outputted by the output unit;
 a creation unit configured to create setting information for the external device based on the setting information received by the reception unit for causing the external device to execute the finishing process when the second judgment unit judges that the external device capable of executing the finishing process that should be processed in the image processing apparatus exists; and
 a transmitting control unit configured to transmit the setting information for the external device created by the creation unit to the external device,
 wherein the output unit outputs a rest of the printed material based on the setting information and the drawing data received by the reception unit to the second discharge tray without executing the finishing process when the second judgment unit judges that the external device capable of executing the finishing process that should be processed in the image processing apparatus exists, then the external device executes the finishing process for the rest of the printed material.

2. The image processing apparatus according to claim 1, wherein a discharge tray of a rest of the print original is different from a discharge tray of the part of the print original.

3. An image processing method used in an image processing apparatus having first and second discharge trays, comprising:
 a reception step of receiving setting information and drawing data;
 an output step of outputting a part of a printed material based on the setting information and the drawing data to the first discharge tray, wherein a finishing process based on the setting information is applied to the part of the printed material;
 a first judgment step of judging whether or not a process based on the setting information and the drawing data is delayed after the part of the printed material is outputted in the output step;
 a second judgment step of judging whether or not there is an external device capable of executing the finishing process that should be processed in the image processing apparatus when it is judged in the first judgment step that the process is delayed after the part of the printed material is outputted in the output step;
 a creation step of creating setting information for the external device based on the setting information received in the reception step for causing the external device to execute the finishing process when it is judged in the second judgment step that the external device capable of executing the finishing process that should be processed in the image processing apparatus exists; and
 a transmitting control step of transmitting the setting information for the external device created by the creation unit to the external device,
 wherein the output step includes outputting a rest of the printed material based on the setting information and the drawing data received in the reception step to the second discharge tray without executing the finishing process when it is judged in the second judgment step that the external device capable of executing the finishing process that should be processed in the image processing apparatus exists, then the external device executes the finishing process for the rest of the printed material.

4. An image processing program having program code and stored on a non-transitory computer readable medium and readable by a computer having first and second discharge trays the code causing the computer to execute a method, comprising:
 a reception step of receiving setting information and drawing data;
 an output step of outputting a part of a printed material based on the setting information and the drawing data to the first discharge tray, wherein a finishing process based on the setting information is applied to the part of the printed material;
 a first judgment step of judging whether or not a process based on the setting information and the drawing data is delayed after the part of the printed material is outputted in the output step;
 a second judgment step of judging whether or not there is an external device capable of executing the finishing process that should be processed in the image processing apparatus when it is judged in the first judgment step that the process is delayed after the part of the printed material is outputted in the output step;
 a creation step of creating setting information for the external device based on the setting information received in the reception step for causing the external device to execute the finishing process when it is judged in the second judgment step that the external device capable of executing the finishing process that should be processed in the image processing apparatus exists; and
 a transmitting control step of transmitting the setting information for the external device created by the creation unit to the external device,
 wherein the output step includes outputting a rest of the printed material based on the setting information and the drawing data received in the reception step to the second discharge tray without executing the finishing process when it is judged in the second judgment step that the external device capable of executing the finishing process that should be processed in the image processing apparatus exists, then the external device executes the finishing process for the rest of the printed material.

* * * * *